(12) United States Patent
Nomura et al.

(10) Patent No.: US 7,835,088 B2
(45) Date of Patent: Nov. 16, 2010

(54) LIGHT SHIELDING STRUCTURE OF AN OPTICAL DEVICE

(75) Inventors: Hiroshi Nomura, Saitama (JP); Takamitsu Sasaki, Saitama (JP); Kazunori Ishizuka, Kanagawa (JP); Kunihiko Shimizu, Saitama (JP)

(73) Assignee: Hoya Corporation, Tokyo (JP)

( * ) Notice: Subject to any disclaimer, the term of this patent is extended or adjusted under 35 U.S.C. 154(b) by 134 days.

(21) Appl. No.: 12/369,231

(22) Filed: Feb. 11, 2009

(65) Prior Publication Data
US 2009/0207505 A1 Aug. 20, 2009

(30) Foreign Application Priority Data
Feb. 14, 2008 (JP) ............................... 2008-033376

(51) Int. Cl.
*G02B 9/00* (2006.01)
(52) U.S. Cl. ...................................... 359/740; 359/739
(58) Field of Classification Search ................. 359/740, 359/739, 819, 821, 826
See application file for complete search history.

(56) References Cited

U.S. PATENT DOCUMENTS

| | | | | |
|---|---|---|---|---|
| 2001/0017736 A1 * | 8/2001 | Nomura et al. | ............. | 359/699 |
| 2004/0160678 A1 | 8/2004 | Nomura et al. | | |
| 2004/0160679 A1 | 8/2004 | Nomura et al. | | |
| 2006/0193625 A1 | 8/2006 | Nomura | | |
| 2006/0274430 A1 | 12/2006 | Nomura et al. | | |
| 2007/0019938 A1 | 1/2007 | Nomura | | |

FOREIGN PATENT DOCUMENTS

| | | |
|---|---|---|
| GB | 2411490 | 8/2005 |
| JP | 2000-121903 | 4/2000 |
| JP | 2004-20774 | 1/2004 |

OTHER PUBLICATIONS

English language Abstract of JP 2000-121903, Apr. 28, 2000.
English language Abstract of JP 2004-20774, Jan. 22, 2004.
U.S. Appl. No. 12/369,161 to Nomura et al., filed on Feb. 11, 2009.
U.S. Appl. No. 12/369,194 to Nomura et al., filed on Feb. 11, 2009.

* cited by examiner

*Primary Examiner*—Timothy J Thompson
(74) *Attorney, Agent, or Firm*—Greenblum & Bernstein, P.L.C.

(57) ABSTRACT

A light shielding structure of an optical device, includes a plurality of optical elements arranged at different positions in an optical axis direction. The light shielding structure includes at least one annular light shielding member positioned between two of the optical elements to shield harmful light, and a plurality of springs held between the two optical elements to be resiliently deformable in the optical axis direction. The springs include at least two springs, one of which is held between one of the two optical elements and the annular light shielding member while the other of the two springs is held between the other of the two optical elements and the annular light shielding member. The annular light shielding member is supported between the two optical elements in a balanced state between the spring forces of the plurality of springs.

14 Claims, 19 Drawing Sheets

LIGHT SHIELDING STRUCTURE OF AN OPTICAL DEVICE

BACKGROUND OF THE INVENTION

1. Field of the Invention

The present invention relates to a light shielding structure of an optical device.

2. Description of the Related Art

In optical devices (e.g., lens barrels) composed of a collection of annular members, various light shielding structures for preventing harmful light such as stray light from entering inside the optical device through gaps formed between the annular members are used. Such light shielding structures conventionally have a general structure in which the entry pathway of harmful light is specified and in which at least one light shielding member (ring) is fixedly installed in the specified entry pathway, such as disclosed in Japanese Unexamined Patent Publication No. 2000-121903 (Japanese Patent No. 4094747).

However, to install the light shielding member fixedly in the specified entry pathway, a special fixing structure is required, so that an increase in number of elements and an increase in man-hours are unavoidable.

SUMMARY OF THE INVENTION

The present invention provides a light shielding structure which can support at least one annular light shielding member in an easy manner when installed, especially between a plurality of optical elements.

The present invention has been devised based on a viewpoint of supporting the annular light shielding member in a balanced state (floating state) between the spring forces of a plurality of springs. According to an aspect of the present invention, a light shielding structure of an optical device is provided, including a plurality of optical elements arranged at different positions in an optical axis direction, the light shielding structure including at least one annular light shielding member positioned between two optical elements of the plurality of optical elements to shield harmful light; and a plurality of springs held between the two optical elements to be resiliently deformable in the optical axis direction. The plurality of springs include at least two springs, one of which is held between one of the two optical elements and the annular light shielding member while the other of the two springs is held between the other of the two optical elements and the annular light shielding member. The annular light shielding member is supported between the two optical elements in a balanced state between the spring forces of the plurality of springs.

According to the above structure, upon the annular light shielding member being installed, the annular light shielding member is supported in a balanced state (floating state) between the spring forces of the plurality of springs, so that an optimum light shielding effect can be obtained by properly determining various specifications such as the spring load of each spring, the length of each spring in the optical axis direction, the diameter of the annular light shielding member and the shape thereof. Each optical element in the present invention can be any optical element. For example, the annular light shielding member can be used to prevent light from entering the space between a plurality of lens groups or between a shutter unit and a lens group.

It is desirable for the annular light shielding member to have at least two annular light shielding members installed between the two optical elements at different positions in the optical axis direction, and for the plurality of springs to include an intermediate spring held between the annular light shielding members to be resiliently deformable in the optical axis direction.

It is desirable for the at least two annular light shielding members to include a front annular light shielding member and a rear annular light shielding member positioned behind the front annular light shielding member in the optical axis direction. The plurality of springs includes a front spring, the intermediate spring and a rear spring, installed in that order in the optical axis direction. The front annular light shielding member is held between a rear end of the front spring and a front end of the intermediate spring. The rear annular light shielding member is held between a rear end of the intermediate spring and a front end of the rear spring.

In addition, if the annular light shielding member is held in a space radially outside one of the two optical elements when the two optical elements closely approach each other in a zooming range thereof, the efficiency of space utilization in the retractable lens barrel can be improved and the retractable lens barrel can be miniaturized.

It is desirable for one of the plurality of optical elements to be a shutter unit.

It is desirable for the annular light shielding member to include at least one radial flange portion which lies in a plane substantially orthogonal to the optical axis and with which an end of the plurality of springs is in contact. More specifically, it is desirable for the radial flange portion of the annular light shielding member to include a first radial flange portion with which a rear end of a spring of the plurality of springs which is positioned in front of the first radial flange portion is in contact, and a second radial flange portion with which a front end of another spring of the plurality of springs which is positioned behind the first radial flange portion is in contact. In addition, it is desirable for the first radial flange portion and the second radial flange portion to be provided at different positions in the optical axis direction, and for the annular light shielding member to include an annular connecting portion which has a center axis thereof substantially on the optical axis and which connects the first radial flange portion and the second radial flange portion to each other.

It is desirable for the first radial flange portion to be provided at a position more rearward in the optical axis direction than that of the second radial flange portion.

Additionally, since the annular light shielding member includes a truncated conical portion positioned radially inside the radial flange portion and formed so that a diameter of the truncated conical portion decreases rearwardly in the optical axis direction, the light shielding effect can be enhanced.

Each spring used as an element of the light shielding structure according to the present invention can be of any type; for instance, a compression coil spring.

It is desirable for the plurality of springs to be compressed in the optical axis direction with the annular light shielding member remaining held therebetween when the two optical elements are moved to closely approach each other in the optical axis direction.

In an embodiment, a retractable lens barrel is provided, having at least one movable barrel capable of advancing and retracting in an optical axis direction, the retractable lens barrel including a plurality of optical elements arranged at different positions in the optical axis direction, at least one annular light shielding member positioned around the optical axis between two optical elements of the plurality of optical elements, and a plurality of springs held between the two optical elements and compressed resiliently in the optical axis direction when the movable barrel retracts. The annular light shielding member is supported between the two optical elements in a balanced state between the spring forces of the plurality of springs.

A light shielding structure which can reliably shield light is achieved, though simple in structure, because at least one annular light shielding member is supported (held resiliently) between optical elements arranged at different positions in an optical axis direction in a in a balanced state (floating state) between the spring forces of a plurality of springs being achieved.

The present disclosure relates to subject matter contained in Japanese Patent Application No. 2008-33376 (filed on Feb. 14, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
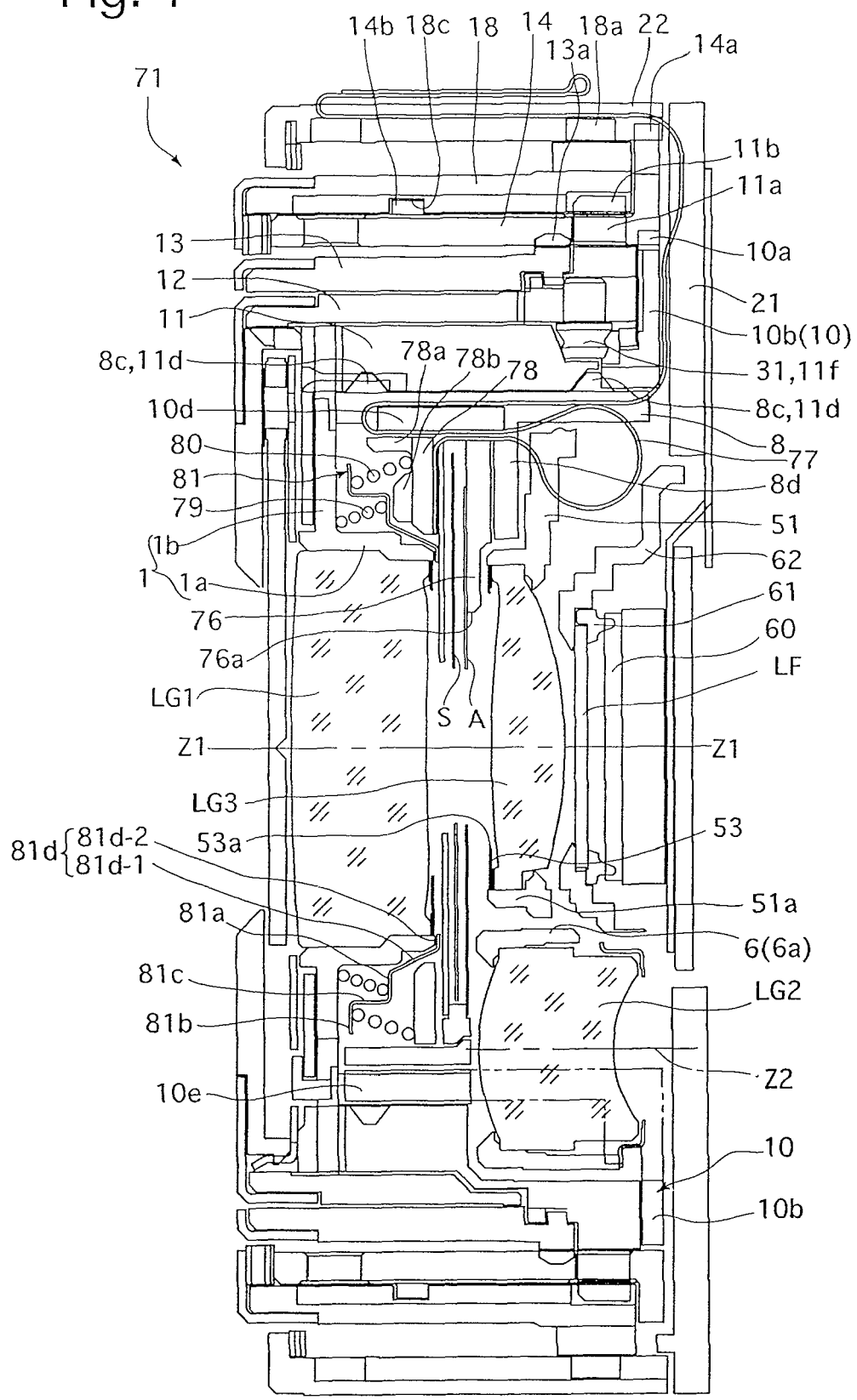
FIG. 1 is an axial cross sectional view of an embodiment of a zoom lens according to the present invention, showing the fully-retracted state of the zoom lens.

The overall structure of an embodiment of a zoom lens 71 will be first discussed hereinafter. The zoom lens 71 is provided with an imaging optical system (photographing optical system) including a first lens group LG1, a shutter S, an adjustable diaphragm A, a second lens group LG2, a third lens group LG3, a low-pass filter (optical filter) LF, and a solid-state image pickup device (hereinafter referred to as an image sensor) 60 in that order from the object side. An imaging optical axis (photographing optical axis) Z1 of the imaging optical system is substantially coincident with the central axis of each external barrel (12, 13 and 18) which forms the outward appearance of the zoom lens 71. The first lens group LG1 and the second lens group LG2 are driven along the imaging optical axis Z1 in a predetermined moving manner to perform a zooming operation, while the third lens group L3 is driven along the imaging optical axis Z1 to perform a focusing operation. In the following descriptions, the term "optical axis direction" means a direction on or parallel to the imaging optical axis Z1 unless there is a different explanatory note on the expression.

The zoom lens 71 is provided with a stationary barrel 22, and is further provided behind the stationary barrel 22 with an image sensor holder 21 fixed to the back of the stationary barrel 22. The image sensor 60 is mounted on the image sensor holder 21 to be held thereby, and the low-pass filter LF is held by the image sensor holder 21 to be positioned in front of the image sensor 60 via a filter holder 62 and an annular sealing member 61. The filter holder 62 is fixed to the front of the image sensor holder 21.

Figure 2:
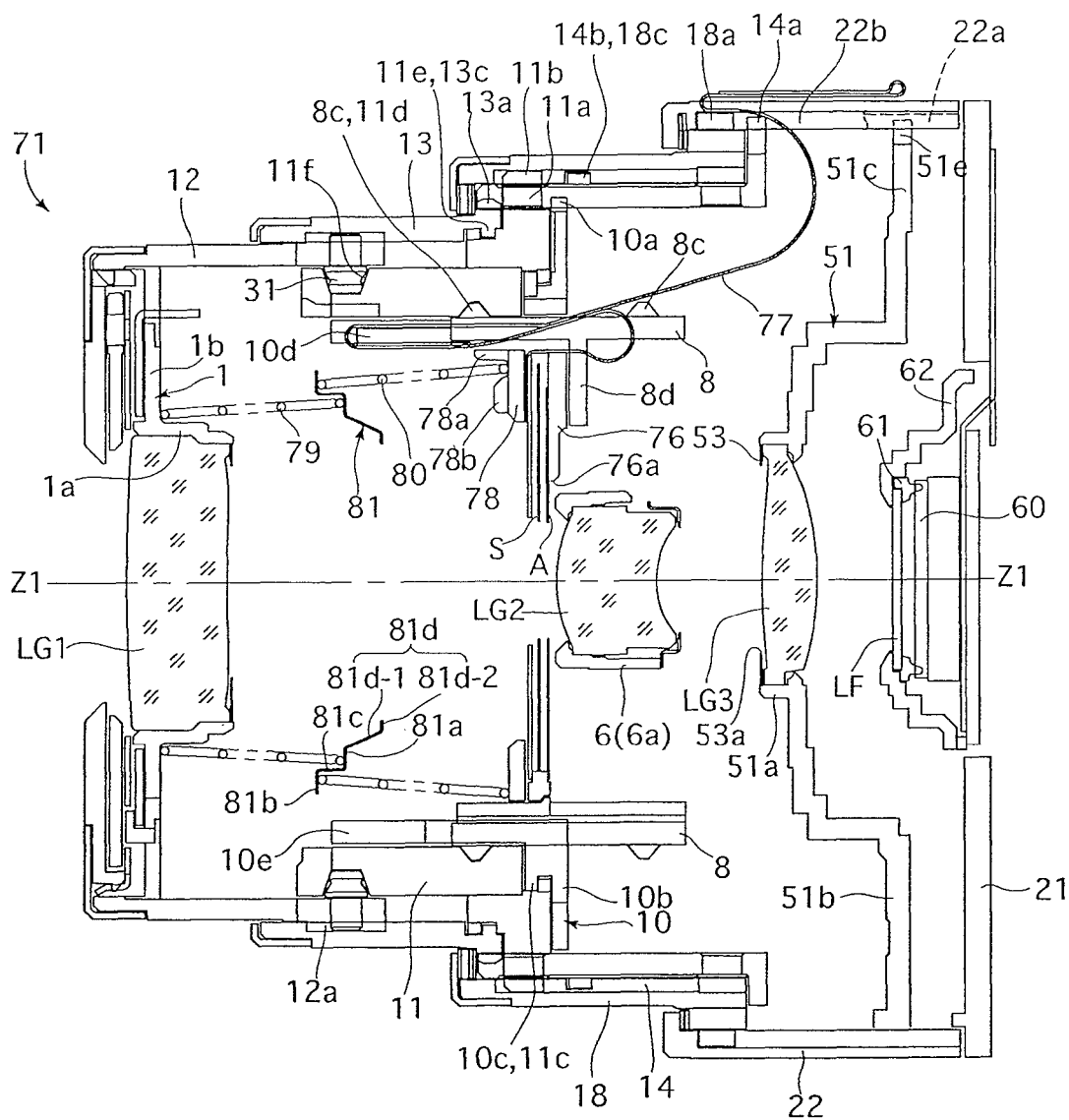
FIG. 2 is an axial cross sectional view of the zoom lens, showing a state of the zoom lens at the wide-angle extremity.
Figure 3:
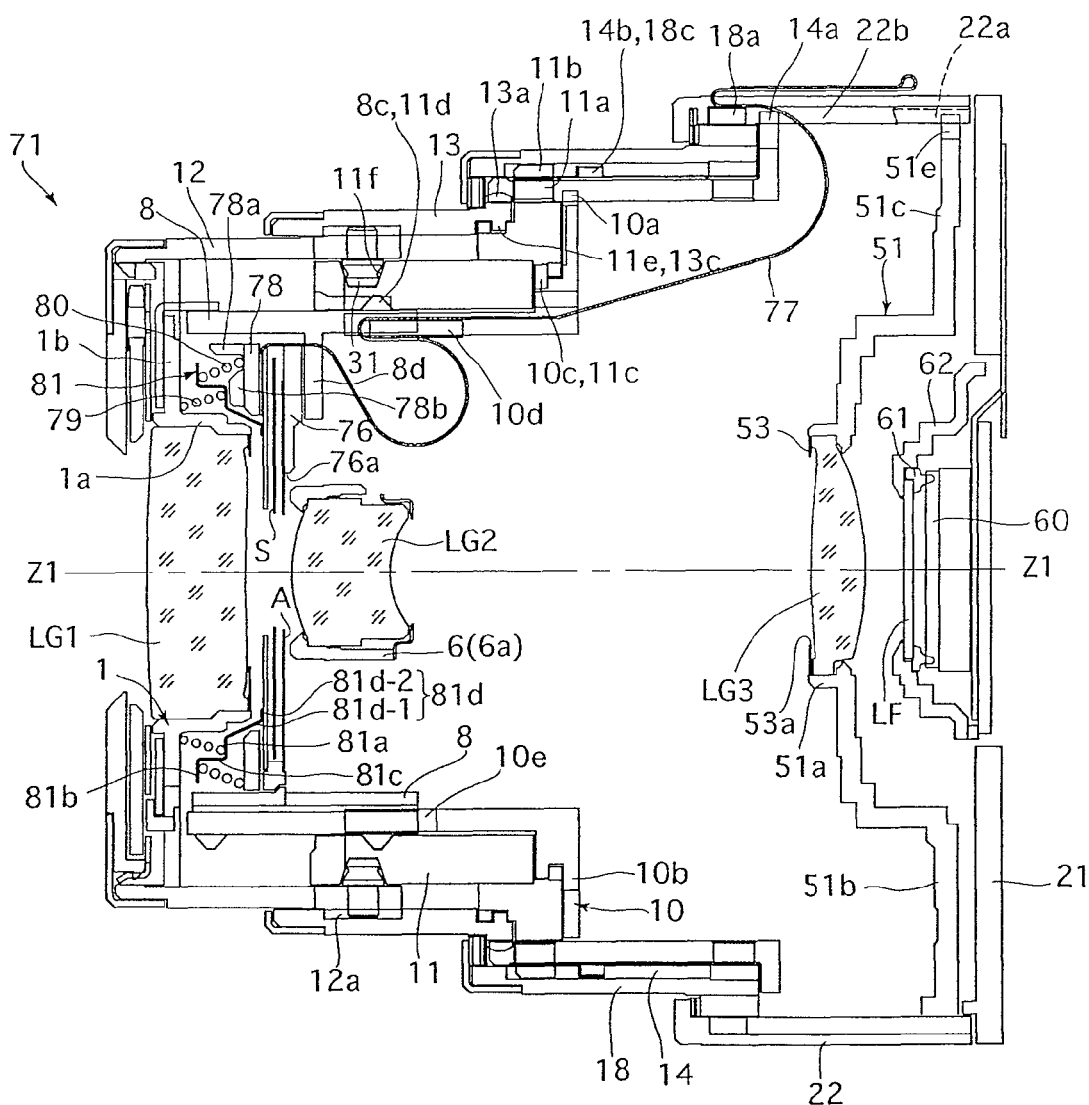
FIG. 3 is an axial cross sectional view of the zoom lens, showing a state of the zoom lens at the telephoto extremity.

The zoom lens 71 is provided in the stationary barrel 22 with an AF lens frame (third lens frame which supports and holds the third lens group LG3) 51 which is guided linearly in the optical axis direction, i.e., without rotating about the imaging optical axis Z1. The AF lens frame 51 is provided with a lens holder portion 51a which holds the third lens group LG3, and a pair of arm portions 51b and 51c which extend radially outwards from the lens holder portion 51a in substantially in opposite directions. The zoom lens 71 is provided between the stationary barrel 22 and the image sensor holder 21 with an AF guide shaft 52 (see FIG. 5), the front and rear ends of which are supported by the stationary barrel 22 and the image sensor holder 21, respectively, so that the AF guide shaft 52 extends parallel to the imaging optical axis Z1. The arm portion 51b of the AF lens frame 51 is provided at the radially outer end thereof with a guide hole 51d in which the AF guide shaft 52 is slidably engaged. The arm portion 51c of the AF lens frame 51 is provided at the radially outer end thereof with a guide end portion 51e which is slidably engaged in a linear guide groove 22a (part of which is shown in FIGS. 2 and 3) formed on an inner peripheral surface of the stationary barrel 22 so as to extend parallel to the imaging optical axis Z1. The zoom lens 71 is provided with an AF motor 160 (see FIG. 5) having a rotary drive shaft which is threaded to serve as a feed screw shaft, and this rotary drive shaft is screwed through a screw hole formed on an AF nut 54 (see FIG. 5). The AF nut 54 abuts against a portion of the arm portion 51b in the vicinity of the guide hole 51d from front while being prevented from rotating relative to the AF lens frame 51. The AF lens frame 51 is biased forward by an AF frame biasing spring 55 to be pressed against the AF nut 54, and the forward movement limit of the AF lens frame 51 in the optical axis direction is determined via engagement between the AF lens frame 51 and the AF nut 54. With this structure, upon the AF nut 54 being moved rearward in the optical axis direction, the AF lens frame 51 is pressed rearward by the AF nut 54 to thereby move rearward against the biasing force of the AF frame biasing spring 55. Conversely, upon the AF nut 54 being forward in the optical axis direction, the AF lens frame 51 follows forward movement of the AF nut 54 to move forward by the biasing force of the AF frame biasing spring 55. With the structure described above, rotating the rotary drive shaft of the AF motor 160 forward and rearward causes the AF lens frame 51 to move forward and rearward in the optical axis direction, respectively.

The zoom lens 71 is provided with a zoom motor 150 and a reduction gear box 74 which are mounted on the stationary barrel 22 to be supported thereby. The reduction gear box 74 contains a reduction gear train for transferring rotation of the zoom motor 150 to a zoom gear 28 (see FIG. 5). The zoom gear 28 is positioned inside the stationary barrel 22 and rotatably fitted on a zoom gear shaft extending parallel to the imaging optical axis Z1.

Figure 5:
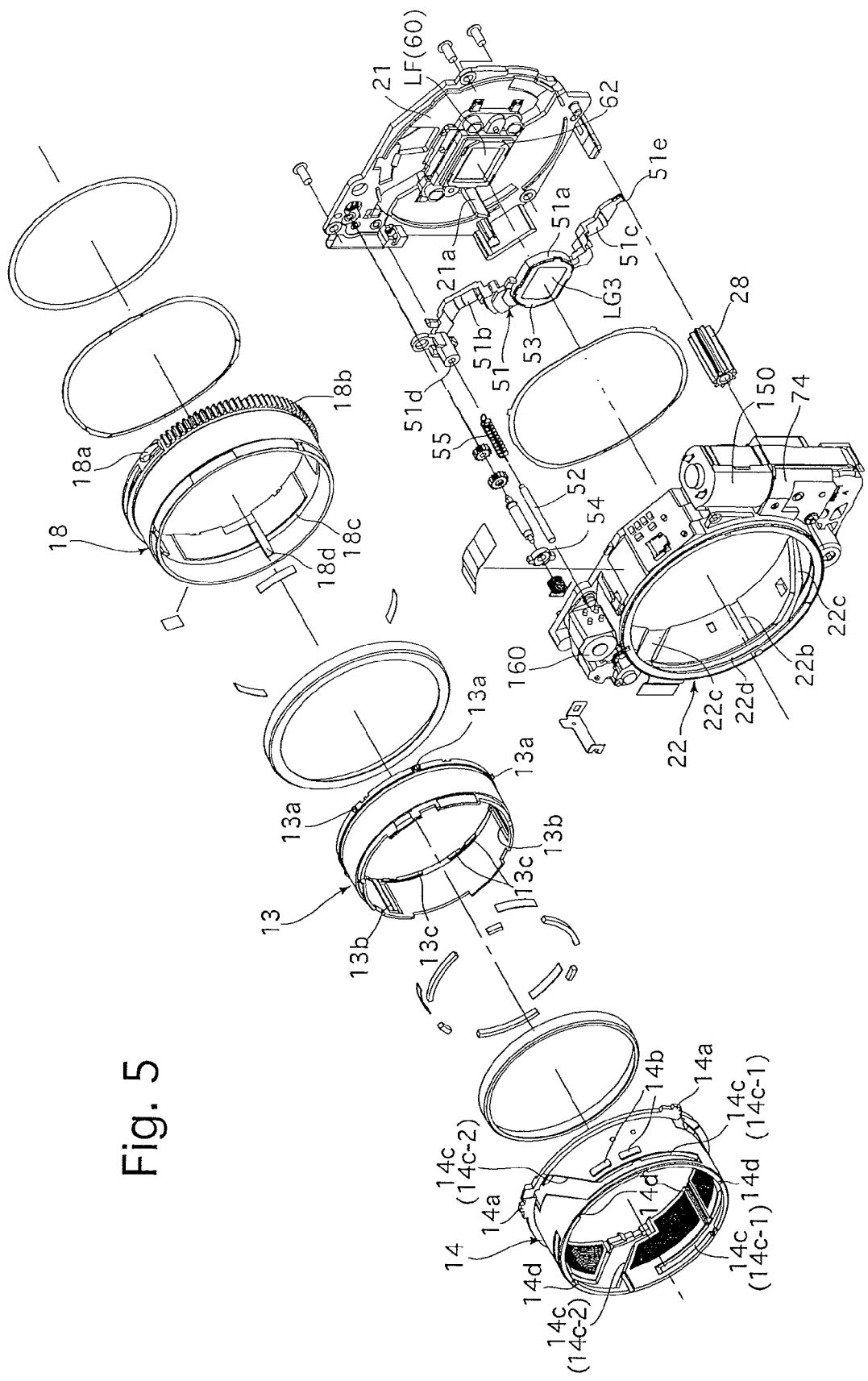
FIG. 5 is an exploded perspective view of another portion of the zoom lens.

As shown in FIG. 5, the stationary barrel 22 is provided on an inner peripheral surface thereof with a set of three linear guide grooves 22b, a set of three inclined grooves 22c and a set of three rotation guide grooves 22d. The linear guide grooves 22b extend parallel to the imaging optical axis Z1. The inclined grooves 22c are inclined with respect to the imaging optical axis Z1. The rotation guide grooves 22d are formed in the vicinity of a front end of the inner peripheral surface of the stationary barrel 22 to extend along a circumference of the stationary barrel 22 to communicate with the front ends of each of the inclined grooves 22c. The three linear guide grooves 22b, the three inclined grooves 22c and the three rotation guide grooves 22d are respectively arranged at substantially equi-angular intervals in the circumferential direction.

The zoom lens 71 is provided immediately inside the stationary barrel 22 with a first advancing barrel (movable barrel) 18 which advances from and retracts into the stationary barrel 22. The first advancing barrel 18 is provided on an outer peripheral surface thereof with a set of three rotation guide projections 18a and an outer circumferential gear 18b. The set of three rotation guide projections 18a are engageable with both the set of three inclined grooves 22c and the set of three rotation guide grooves 22d, respectively. The outer circumferential gear 18b is engaged with the zoom gear 28. During the time the set of three rotation guide projections 18a remain engaged in the set of three inclined grooves 22c, the first advancing barrel 18 advances and retracts in the optical axis direction while rotating while being guided by the set of three inclined grooves 22c. Thereafter, upon the set of three rotation guide projections 18a entering the set of three rotation guide grooves 22d, respectively, the first advancing barrel 18 only rotates about the imaging optical axis Z1 at an axially fixed position (i.e., does not move in the optical axis direction relative to the stationary barrel 22) while being guided by the set of three rotation guide grooves 22d.

The first advancing barrel 18 is provided on an inner peripheral surface thereof with a circumferential groove 18c about the imaging optical axis Z1 and a set of three rotation transfer grooves 18d which extend parallel to the imaging optical axis Z1. The zoom lens 71 is provided with a first linear guide ring 14 which is positioned inside the first advancing barrel 18 and supported thereby. The first linear guide ring 14 is provided on an outer peripheral surface thereof with a set of three linear guide projections 14a and a plurality of relative rotation guide projections 14b. The set of three linear guide projections 14a project radially outwards, and the plurality of relative rotation guide projections 14b project radially outwards at different circumferential positions on the first linear guide ring 14. The first linear guide ring 14 is guided linearly in the optical axis direction relative to the stationary barrel 22 by engagement of the set of three linear guide projections 14a with the set of three linear guide grooves 22b. The first advancing barrel 18 is coupled to the first linear guide ring 14 by making the circumferential groove 18c engaged with the plurality of relative rotation guide projections 14b. The first advancing barrel 18 and the first linear guide ring 14 move together in the optical axis direction.

The first linear guide ring 14 is provided with a set of through-slots 14c which are formed through inner and outer peripheral surfaces of the first linear guide ring 14. As shown in FIG. 5, each through-slot 14c includes a front circumferential slot portion 14c-1 and an inclined lead slot portion 14c-2 which is inclined with respect to the optical axis direction. The number of the through-slots 14c is three; the three through-slots 14c are arranged at different circumferential positions. The zoom lens 71 is provided with a cam ring 11 which is positioned inside the first linear guide ring 14 and rotatably supported thereby. A set of three cam ring guide projections 11a fixed to an outer peripheral surface of the cam ring 11 at different circumferential positions thereon are engaged in the set of three through-slots 14c, respectively. The cam ring 11 is provided on the set of three cam ring guide projections 11a with a set of three rotation transfer projections 11b which project radially outwards to be engaged in the set of three rotation transfer grooves 18d of the first advancing barrel 18, respectively. The set of three rotation transfer projections 11b are slidable relative to the set of three rotation transfer grooves 18d in the optical axis direction and are prevented from moving in the circumferential direction relative to the set of three rotation transfer grooves 18d so that the cam ring 11 rotates with the first advancing barrel 18.

Advancing operations of movable elements of the zoom lens 71 from the stationary barrel 22 to the cam ring 11 are understood from the above described structure of the zoom lens 71. Namely, rotating the zoom gear 28 in a lens barrel advancing direction by the zoom motor 150 causes the first advancing ring 18 to move forward while rotating due to engagement of the set of three inclined grooves 22c with the set of three rotation guide projections 18a. This rotation of the first advancing barrel 18 causes the first linear guide ring 14 to move forward with the first advancing barrel 18 because the first advancing barrel 18 is coupled to the first linear guide ring 14 in a manner to make relative rotation between the first advancing barrel 18 and the first linear guide ring 14 possible and to be movable with the first linear guide ring 14 in the optical axis direction due to the engagement of the plurality of relative rotation guide projections 14b with the circumferential groove 18c. In addition, rotation of the first advancing barrel 18 is transferred to the cam ring 11 via the set of three rotation transfer grooves 18d and the set of three rotation transfer projections 11b. Thereupon, the cam ring 11 moves forward while rotating relative to the first linear guide ring 14 while the set of three cam ring guide projections 11a are guided by the lead slot portions 14c-2 of the set of three through-slots 14c, respectively. Since the first linear guide ring 14 itself also moves forward with the first advancing barrel 18 as described above, the cam ring 11 eventually moves forward in the optical axis direction by an amount of movement corresponding to the sum of the amount of the forward movement of the cam ring 11 (while it rotates) in accordance with the contours of the lead slot portions 14c-2 of the set of three through-slots 14c and the amount of the forward linear movement of the first linear guide ring 14.

The above described advancing operation of the cam ring 11 is performed only while each rotation guide projection 18a and the associated inclined groove 22c are engaged with each other. Upon the first advancing barrel 18 being moved forward by a predetermined amount of movement, the set of three rotation guide projections 18a are disengaged from the set of three inclined grooves 22c to enter the set of three rotation guide grooves 22d, respectively. Thereupon, a forward moving force which makes the first advancing barrel 18 move forward stops being applied to the first advancing barrel 18, so that the first advancing barrel 18 only rotates at an axial fixed position, i.e., without moving in the optical axis direction, due to the engagement of the set of three rotation guide projections 18a with the set of three rotation guide grooves 22d. In addition, at substantially the same time when the set of three rotation guide projections 18a slide into the set of three rotation guide grooves 22d from the set of three inclined grooves 22c, respectively, the set of three cam ring guide projections 11a enter the circumferential slot portions 14c-1 of the set of three through-slots 14c, respectively. Thereupon, a force which makes the cam ring 11 move forward also stops being applied to the cam ring 11. Consequently, the cam ring 11 only rotates at an axial fixed position in the optical axis direction in accordance with rotation of the first advancing barrel 18.

The first linear guide ring 14 is provided on an inner peripheral surface thereof with a plurality of linear guide grooves 14d which are formed at different circumferential positions to extend parallel to the imaging optical axis Z1. The zoom lens 71 is provided inside the first linear guide ring 14 with a second linear guide ring 10. The second linear guide ring 10 is provided on an outer edge thereof with a corresponding plurality of linear guide projections 10a which project radially outwards to be slidably engaged in the plurality of linear guide grooves 14d, respectively. The zoom lens 71 is provided immediately inside of the first advancing barrel 18 with a second advancing barrel (movable barrel) 13 which advances from and retracts into the first advancing barrel 18. The second advancing barrel 13 is provided, on an outer peripheral surface thereof in the vicinity of the rear end of the second advancing barrel 13, with a plurality of radial projections 13a which project radially outwards to be slidably engaged in the plurality of linear guide grooves 14d, respectively. Therefore, each of the second advancing barrel 13 and the second linear guide ring 10 is guided linearly in the optical axis direction via the first linear guide ring 14.

The zoom lens 71 is provided inside the cam ring 11 with a second lens group moving frame 8 which indirectly supports and holds the second lens group LG2. The zoom lens 71 is provided immediately inside the second advancing barrel 13 with a third advancing barrel (movable barrel) 12 which advances from and retracts into the second advancing barrel 13. The second advancing barrel 13 serves as a linear guide member for linearly guiding the third advancing barrel 12 that supports the first lens group LG1.

The support structure for the second lens group LG2 will be discussed hereinafter. The second linear guide ring 10 is provided with an annular flange portion 10b and a front annular flange portion 10c. The plurality of linear guide projections 10a project radially outwards from the outer edge of the annular flange portion 10b, and the front annular flange portion 10c is formed in front of the annular flange portion 10b and is smaller in diameter than the annular flange portion 10b. The front annular flange portion 10c is slidably engaged in a circumferential groove 11c formed on an inner peripheral surface of the cam ring 11 in the vicinity of the rear end thereof. Due to this structure, the second linear guide ring 10 is coupled to the cam ring 11 to be rotatable relative to the cam ring 11 and to be prevented from moving in the optical axis direction relative to the cam ring 11. The second linear guide ring 10 is provided with a first linear guide key 10d and a second linear guide key 10e both of which project toward the front from the front annular flange portion 10c. The first linear guide key 10d and the second linear guide key 10e project forward to be positioned inside of the cam ring 11. Opposite edges of the first linear guide key 10d in the circumferential direction of the second linear guide ring 10 are formed as a pair of linear guide surfaces G1 that are parallel to the imaging optical axis Z1, and opposite edges of the second linear guide key 10e in the circumferential direction of the second linear guide ring 10 are formed as a pair of linear guide surfaces G2 that are also parallel to the imaging optical axis Z1.

The second lens group moving frame 8, which is positioned inside the cam ring 11 and supported thereby, is provided with a first linear guide groove 8a and a second linear guide groove 8b in which the first linear guide key 10d and the second linear guide key 10e are engaged, respectively. Each of the first linear guide groove 8a and the second linear guide groove 8b is formed as a partly-bottomed groove on an outer peripheral surface of the second lens group moving frame 8; more specifically, the second lens group moving frame 8 is provided at the midportion in the width direction of the first linear guide groove 8a with a radial through-hole through which a flexible PWB 77 for exposure control passes, and the second lens group moving frame 8 is provided, at the midportion in the width direction of the second linear guide groove 8b at the rear end thereof, with a through-cutout 8g which is formed through the bottom wall of the second linear guide groove 8b in a radial direction of the second lens group moving frame 8. The second lens group moving frame 8 is provided, in the first linear guide groove 8a on the circumferentially opposite sides thereof, with a pair of linear guide surfaces G3 which are in sliding contact with the pair of linear guide surfaces G1 of the first linear guide key 10d, respectively. Likewise, the second lens group moving frame 8 is provided, in the second linear guide groove 8b on the circumferentially opposite sides thereof, with a pair of linear guide surfaces G4 which are in sliding contact with the pair of linear guide surfaces G2 of the second linear guide key 10e, respectively. Due to the engagement between the pair of linear guide surfaces G3 and the pair of linear guide surfaces G1 and the engagement between the pair of linear guide surfaces G4 and the pair of linear guide surfaces G2, the second lens group moving frame 8 is guided linearly in the optical axis direction.

The cam ring 11 is provided on an inner peripheral surface thereof with a plurality of cam grooves 11d in which a corresponding plurality of cam followers 8c formed on an outer peripheral surface of the second lens group moving frame 8 are engaged, respectively. The plurality of cam grooves 11d and the plurality of cam followers 8c are utilized for relatively moving the second lens group LG2 in the optical axis direction. Namely, since the second lens group moving frame 8 is guided linearly in the optical axis direction via the second linear guide ring 10, a rotation of the cam ring 11 causes the second lens group moving frame 8 to move in the optical axis direction in a predetermined moving manner in accordance with the contours of the plurality of cam grooves 11d.

Figure 4:
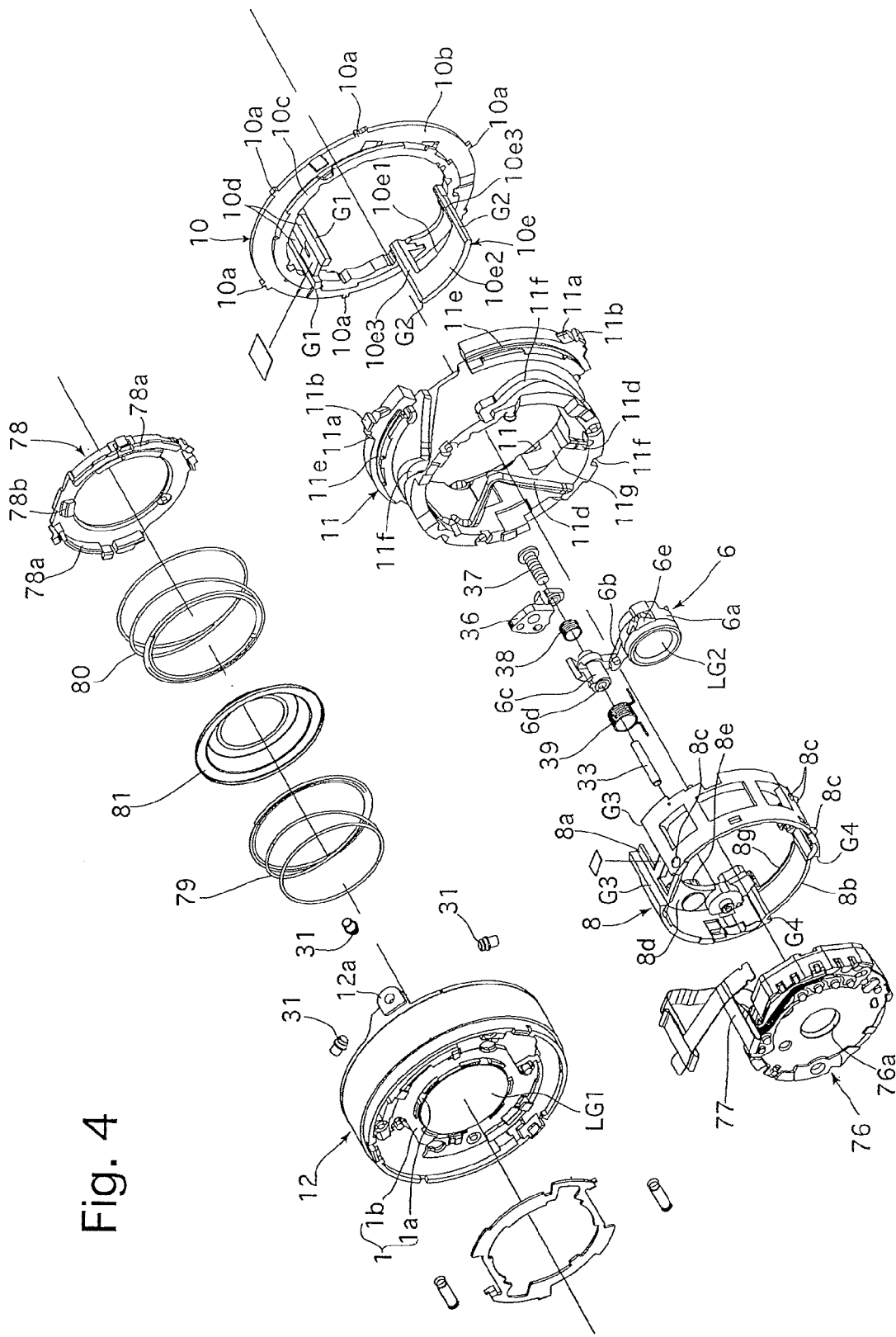
FIG. 4 is an exploded perspective view of a portion of the zoom lens.
Figure 6:
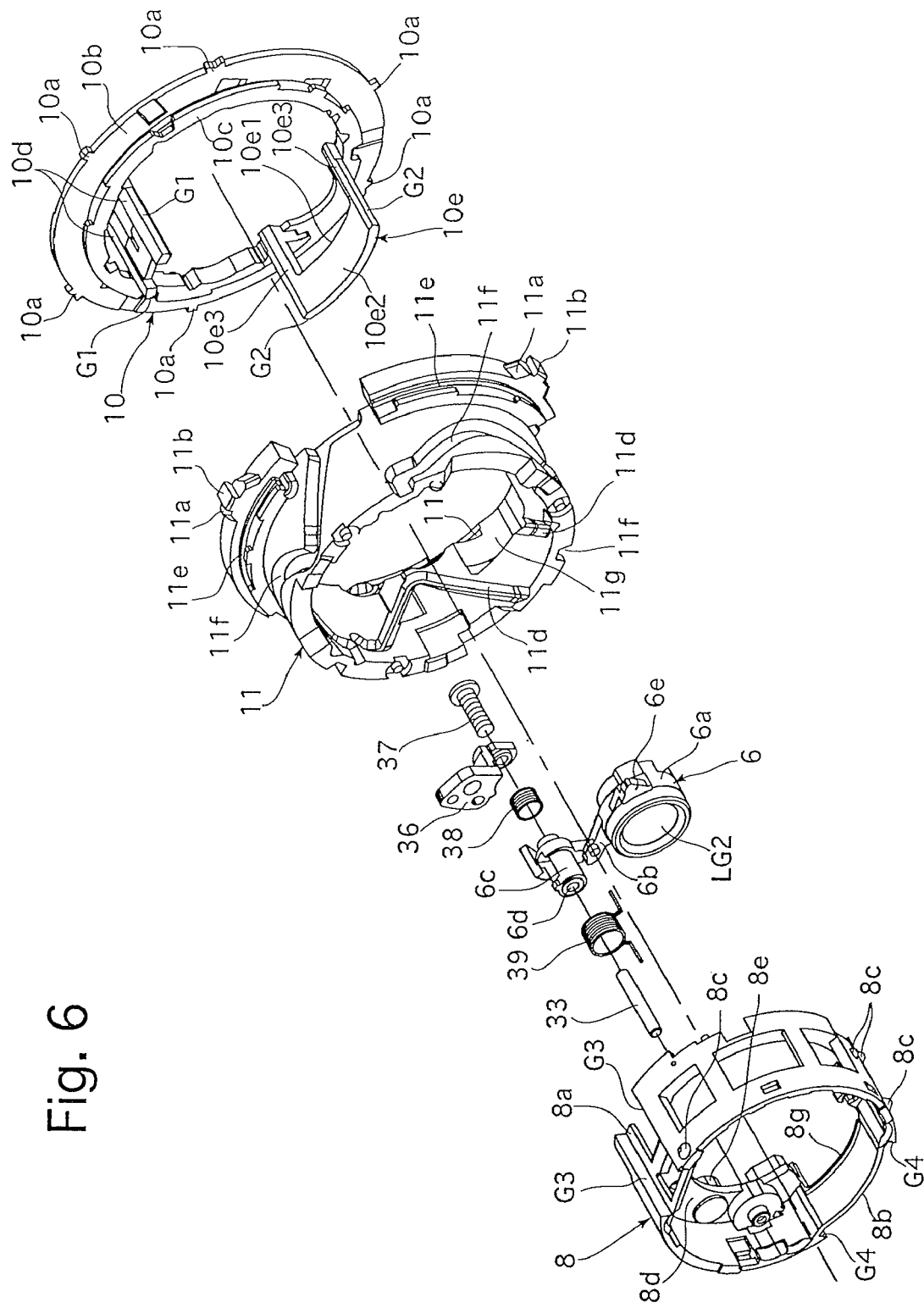
FIG. 6 is an exploded perspective view of a portion of the zoom lens which includes a second lens group moving frame, a second lens frame, a cam ring and a second linear guide ring.
Figure 7:
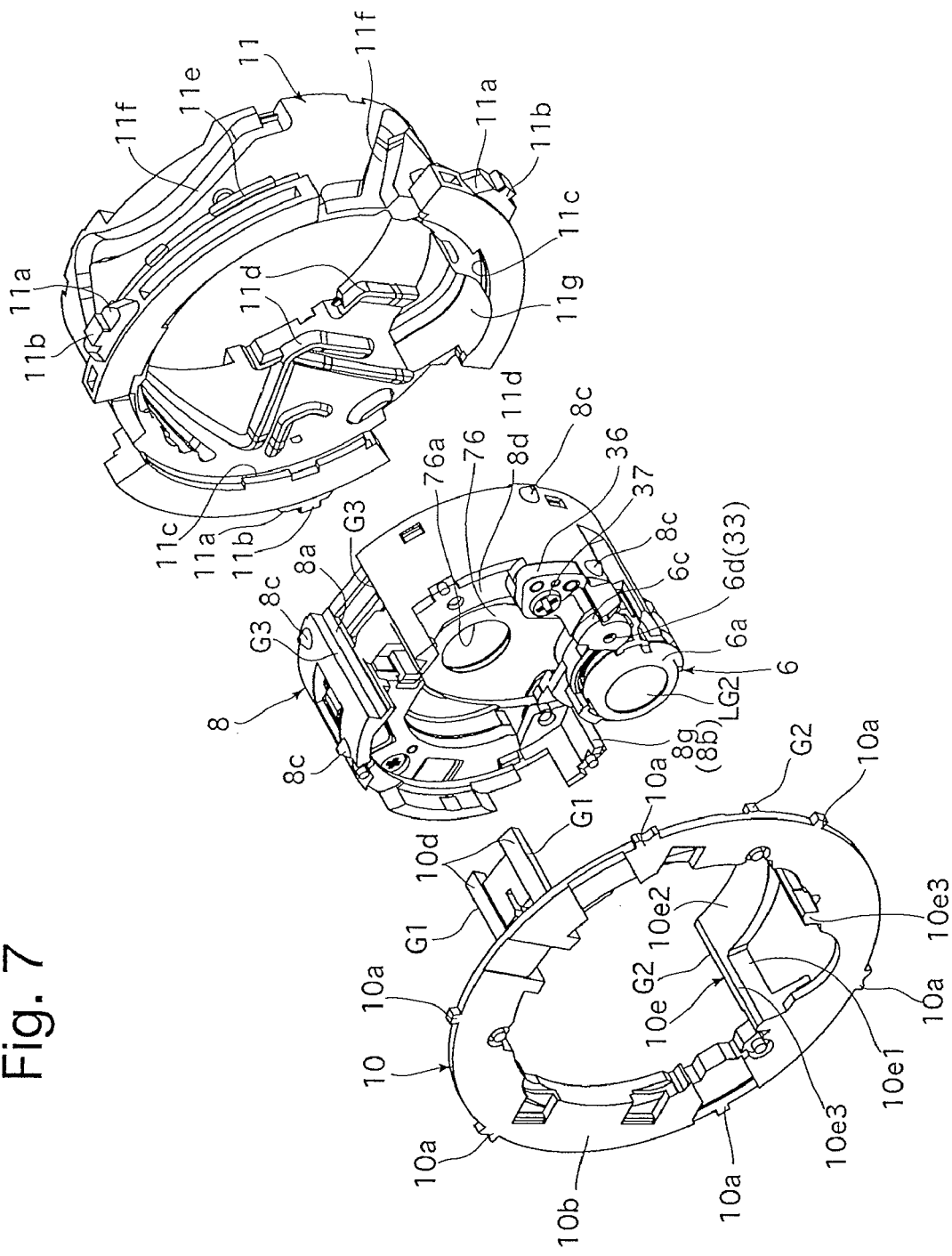
FIG. 7 is an exploded perspective view of the second lens group moving frame to which the second lens frame is mounted, the cam ring and the second linear guide ring, viewed obliquely from the rear side in the direction opposite to the viewing direction of FIG. 6.
Figure 8:
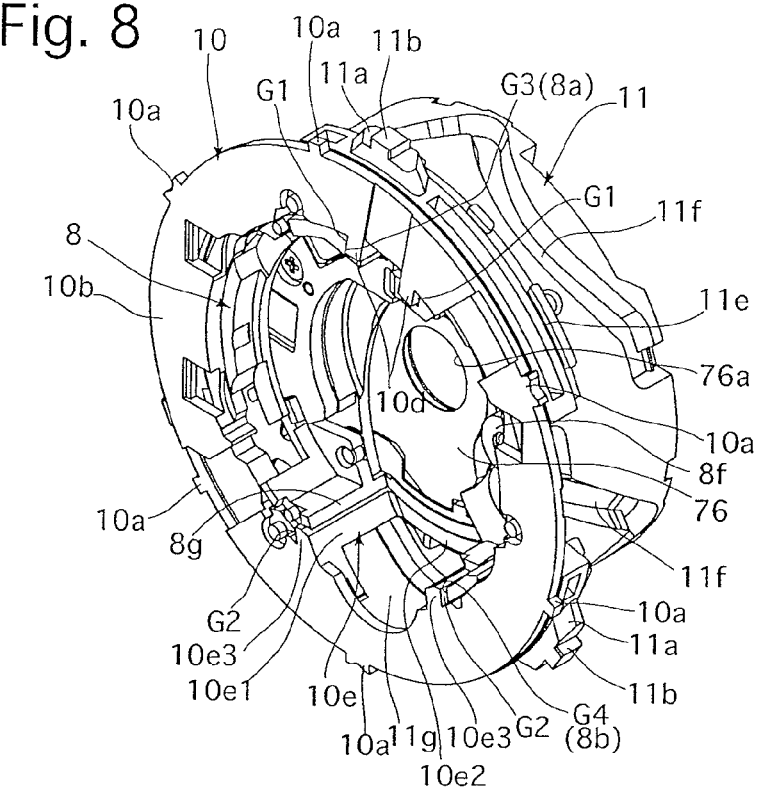
FIG. 8 is a rear perspective view of the second lens group moving frame, the cam ring and the second linear guide ring which are assembled together with the second lens frame being removed.
Figure 9:
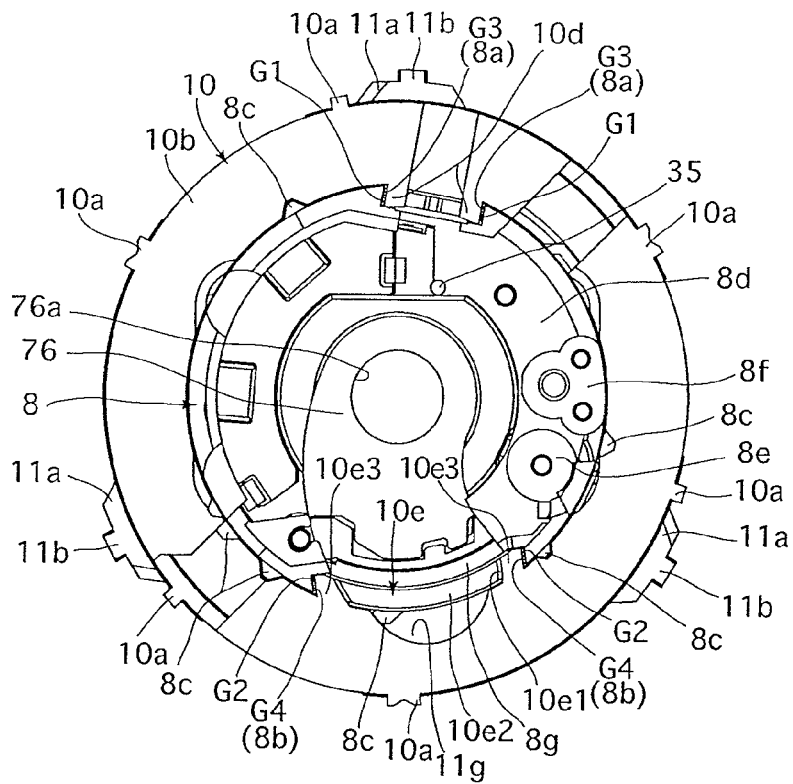
FIG. 9 is a rear elevational view of the elements shown in FIG. 8.
Figure 13:
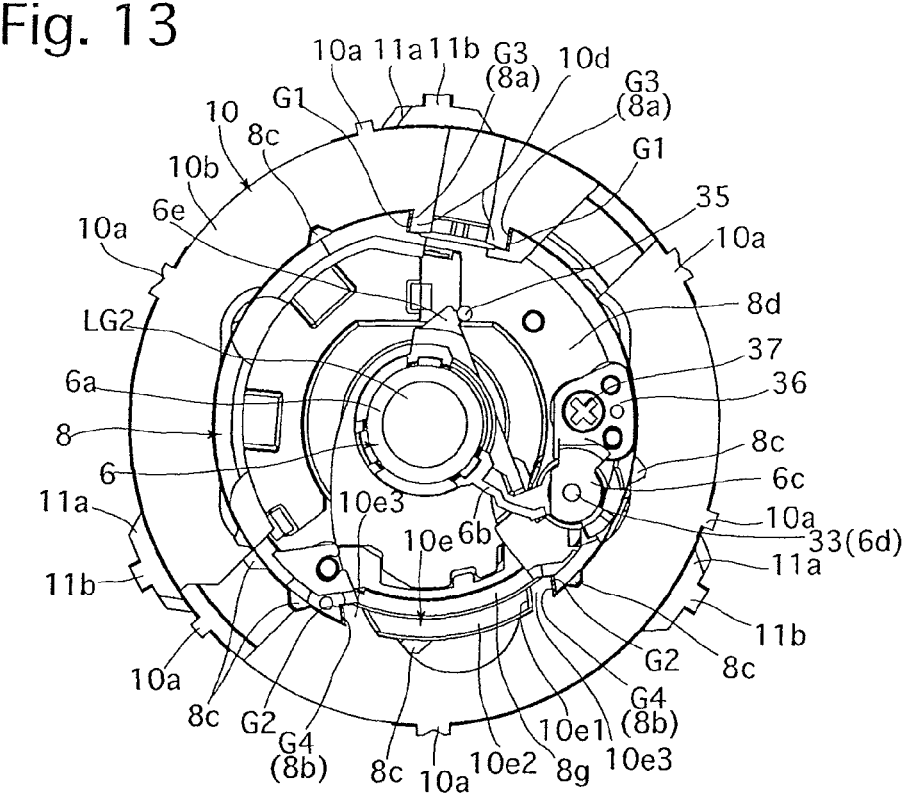
FIG. 13 is a rear elevational view of the elements shown in FIG. 12.

The second lens group moving frame 8 is provided with an annular flange 8d having a through-opening at a center thereof through which the imaging optical axis Z1 passes. A second lens group pivot shaft 33 is fixed to the second lens group moving frame 8 to extend parallel to the imaging optical axis Z1. The front and rear ends of the second lens group pivot shaft 33 are supported by a shaft support portion 8e formed on the annular flange portion 8d (see FIGS. 4 and 6) and a shaft support member 36, respectively. The shaft support member 36 is fixed to a mounting seat 8f (see FIGS. 8 and 9) formed on the rear of the annular flange 8d by a fixing screw 37. The zoom lens 71 is provided inside the second lens group moving frame 8 with a second lens frame 6 which supports and holds the second lens group LG2. The second lens frame 6 is pivoted on the second lens group pivot shaft 33. The second lens frame 6 is provided with a cylindrical lens holder portion 6a, a swing arm portion 6b and a pivoted cylindrical portion 6c. The cylindrical lens holder portion 6a holds the second lens group LG2. The swing arm portion 6b extends in a radial direction of the cylindrical lens holder portion 6a, and the pivoted cylindrical portion 6c is formed at the free end (opposite end) of the swing arm portion 6b. The pivoted cylindrical portion 6c is provided with a through-hole 6d extending in a direction parallel to the optical axis Z2 of the second lens group LG2. The second lens group pivot shaft 33 is inserted into the through-hole 6d so as to allow relative rotation therebetween. The second lens group pivot shaft 33 is eccentrically positioned with respect to the imaging optical axis Z1, and extends parallel to the imaging optical axis Z1. The second lens frame 6 is rotatable (swingable) about the second lens group pivot shaft 33 between an on-axis position (photographing position) shown in FIGS. 2, 3, 12 and 13 where the optical axis Z2 of the second lens group LG2 coincides with the imaging optical axis Z1, and an off-axis displaced position (retracted away from the imaging optical axis Z1) shown in FIGS. 1, 10, 11 and 20 through 22 where the optical axis Z2 of the second lens group LG2 is eccentrically positioned with respect to the imaging optical axis Z1. The second lens frame 6 is biased to rotate in a direction toward the on-axis position by a torsion coil spring (second-lens-group returning spring) 39. The second lens frame 6 and the second lens group moving frame 8 are provided with an engaging protrusion 6e and a rotation limit pin 35 (see FIGS. 9, 11 and 13), respectively, and the on-axis position of the second lens frame 6 is determined by the engagement of the engaging protrusion 6e of the second lens frame 6 with the rotation limit pin 35. The second lens frame 6 is biased forward (in a direction to bring the second lens frame 6 into contact with the annular flange 8d of the second lens group moving frame 8) by a compression coil spring (axial direction pressure spring) 38 to remove backlash of the second lens frame 6 relative to the second lens group moving frame 8 in the optical axis direction.

The second lens frame 6 moves integrally with the second lens group moving frame 8 in the optical axis direction. The image sensor holder 21 is provided on the front thereof with a position-control cam bar 21a which projects forward from the image sensor holder 21 to be engageable with the second lens frame 6. If the second lens group moving frame 8 moves rearward in a retracting direction to approach the image sensor holder 21 in a state where the second lens frame 6 is supported at the on-axis position, a cam surface formed on a front end surface of the position-control cam bar 21a comes into contact with the second lens frame 6 to rotate the second lens frame 6 to the aforementioned off-axis displaced position against the biasing force of the torsion coil spring 39.

The zoom lens 71 is provided in the second lens group moving frame 8 with a shutter unit 76 which includes the shutter S (which opens and shuts a photographing aperture 76a) and the adjustable diaphragm A. The shutter unit 76 is fixed to the front of the annular flange portion 8d of the second lens group moving frame 8. The distance between the shutter S and the second lens group LG2 in the optical axis direction is fixed, and the distance between the adjustable diaphragm A and the second lens group LG2 in the optical axis direction is fixed. The shutter unit 76 is provided therein with a shutter actuator and a diaphragm actuator (both not shown) for driving the shutter S and the adjustable diaphragm A, respectively, and the flexible PWB 77 extends from the shutter unit 76 to establish electrical connection between a control circuit of the camera (not shown) to which the zoom lens 71 is mounted and each of these two actuators.

The support structure for the first lens group LG1 will be discussed hereinafter. The second advancing barrel 13, which is guided linearly in the optical axis direction via the first linear guide ring 14, is provided on an inner peripheral surface thereof with a set of three linear guide grooves 13b which are formed at different circumferential positions to extend in the optical axis direction. The third advancing barrel 12 is provided on an outer peripheral surface at the rear end thereof with a set of three engaging protrusions 12a which are slidably engaged in the set of three linear guide grooves 13b, respectively. Accordingly, the third advancing barrel 12 is guided linearly in the optical axis direction via the first linear guide ring 14 and the second advancing barrel 13. The second advancing barrel 13 is further provided, on an inner peripheral surface thereof in the vicinity of the rear end thereof, with a discontinuous inner flange 13c which extends along the circumference of the second advancing barrel 13. The cam ring 11 is provided on an outer peripheral surface thereof with a discontinuous circumferential groove 11e in which the discontinuous inner flange 13c is slidably engaged so that the cam ring 11 is rotatable relative to the second advancing barrel 13 and so that the second advancing barrel 13 does not relatively move in the optical axis direction with respect to the cam ring 11. The third advancing barrel 12 is provided on an inner peripheral surface thereof with a set of three cam followers 31 which project radially inwards, while the cam ring 11 is provided on an outer peripheral surface thereof with a set of three outer cam grooves 11f (cam grooves for moving the first lens group LG1) in which the set of three cam followers 31 are slidably engaged, respectively. A first lens frame 1 (see FIGS. 1 through 3) which holds the first lens group LG1 is provided inside the third advancing barrel 12.

An advancing operation and a retracting operation of the zoom lens 71 will be discussed hereinafter.

Since the stage at which the cam ring 11 is driven to advance from the retracted position (shown in FIG. 1) to the position (shown in FIG. 2) where the cam ring 11 rotates at the axial fixed position in the optical axis direction has been discussed above, this stage will only be briefly discussed hereinafter. Rotating the zoom gear 28 in the lens barrel advancing direction via the zoom motor 150 from the retracted state of the zoom lens 71 shown in FIG. 1 causes the first advancing barrel 18 to move forward while rotating. At this time, the cam ring 11 which rotates by rotation of the first advancing barrel 18 moves forward in the optical axis direction by an amount of movement corresponding to the sum of the amount of the forward movement of the first linear guide ring 14 and the amount of the forward movement of the cam ring 11 by a leading structure between the cam ring 11 and the first linear guide ring 14 (i.e., by engagement of the set of cam ring guide projections 11a and the lead slot portions 14c-2 of the set of three through-slots 14c, respectively). Once the first advancing barrel 18 and the cam ring 11 advance to respective predetermined positions, the functions of the rotating-advancing structures of the first advancing barrel 18 and the cam ring 11 are canceled, so that each of the first advancing barrel 18 and the cam ring 11 rotates about the imaging optical axis Z1 without moving in the optical axis direction.

A rotation of the cam ring 11 causes the second lens group moving frame 8, which is positioned inside the cam ring 11, to move in the optical axis direction with respect to the cam ring 11 in a predetermined moving manner due to the engagement of the plurality of cam followers 8c of the second lens group moving frame 8 with the plurality of cam grooves 11d, respectively. In the state shown in FIG. 1, in which the zoom lens 71 is in the retracted state, the second lens frame 6, which is positioned inside the second lens group moving frame 8, is held at the off-axis displaced position, in which the optical axis Z2 of the second lens group LG2 is eccentricity positioned downward from the imaging optical axis Z1, by the position-control cam bar 21a. During the course of movement of the second lens group moving frame 8 from the retracted position to the wide-angle extremity position in the zooming range, the second lens frame 6 is disengaged from the position-control cam bar 21a to rotate about the second lens group pivot shaft 33 from the off-axis displaced position to the photographing position where the optical axis Z2 of the second lens group LG2 coincides with the imaging optical axis Z1 via the spring force of the torsion coil spring 39. Thereinafter, the second lens frame 6 remains held in the photographing position until the zoom lens 71 is retracted to the retracted position.

In addition, a rotation of the cam ring 11 causes the third advancing barrel 12, which is positioned around the cam ring 11 and guided linearly in the optical axis direction via the second advancing barrel 13, to move in the optical axis direction relative to the cam ring 11 in a predetermined moving manner due to engagement of the set of three cam followers 31 with the set of three outer cam grooves 11f, respectively.

Therefore, an axial position of the first lens group LG1 relative to an imaging surface (light-receiving surface of the image sensor 60) when the first lens group LG1 is moved forward from the retracted position is determined by the sum of the amount of forward movement of the cam ring 11 relative to the stationary barrel 22 and the amount of movement of the third advancing barrel 12 relative to the cam ring 11, while an axial position of the second lens group LG2 relative to the imaging surface when the second lens group LG2 is moved forward from the retracted position is determined by the sum of the amount of forward movement of the cam ring 11 relative to the stationary barrel 22 and the amount of movement of the second lens group moving frame 8 relative to the cam ring 11. A zooming operation is carried out by moving the first and second lens groups LG1 and LG2 along the imaging optical axis Z1 while changing the air-distance therebetween. When the zoom lens 71 is driven to advance from the retracted position shown in FIG. 1, the zoom lens 71 firstly extends into the state shown in FIG. 2, in which the zoom lens 71 is set at the wide-angle extremity. Subsequently, the zoom lens 71 goes into the state shown in FIG. 3, in which the zoom lens 71 is set at the telephoto extremity by a further rotation of the zoom motor 150 in a lens barrel advancing direction thereof. As can be seen from FIGS. 2 and 3, the space between the first and second lens groups LG1 and LG2 when the zoom lens 71 is set at the wide-angle extremity is greater than that when the zoom lens 71 is set at the telephoto extremity. When the zoom lens 71 is set at the telephoto extremity, the first and second lens groups LG1 and LG2 have moved to approach each other to have a distance therebetween which is smaller than that of when the zoom lens 71 is set at the wide-angle extremity. This variation of the air-distance between the first and second lens groups LG1 and LG2 for zooming operation is achieved by contours of the plurality of cam grooves 11d and the set of three outer cam grooves 11f. In the zooming range (zooming operation performable range) between the wide-angle extremity and the telephoto extremity, the cam ring 11 and the first advancing barrel 18 rotate at their respective axial fixed positions, i.e., without moving in the optical axis direction.

When the first through third lens groups LG1, LG2 and LG3 are positioned in the zooming range, a focusing operation is carried out by moving the third lens group L3 (the AF lens frame 51) along the imaging optical axis Z1 by rotation of the AF motor 160 in accordance with an object distance.

Driving the zoom motor 150 in a lens barrel retracting direction causes the zoom lens 71 to operate in the reverse manner to the above described advancing operation so as to fully retract the zoom lens 71 to the retracted position as shown in FIG. 1. During the course of this retracting movement of the zoom lens 71, the second lens frame 6 rotates about the second lens group pivot shaft 33 to the off-axis displaced position via the position-control cam bar 21a while moving rearward with the second lens group moving frame 8. When the zoom lens 71 is retracted to the retracted position, the second lens group LG2 is retracted into a space radially outside the space in which the third lens group LG3, the low-pass filter LF and the image sensor 60 are accommodated as shown in FIG. 1. In other words, the second lens group LG2 is radially retracted into an axial range substantially identical to an axial range in the optical axis direction in which the third lens group LG3, the low-pass filter LF and the CCD image sensor 60 are positioned. This structure of the zoom lens 71 for retracting (displacing) the second lens group LG2 in this manner reduces the length of the zoom lens 71 when the zoom lens 71 is fully retracted, thus making it possible to achieve a reduction of the thickness of the camera to which the zoom lens 71 is mounted.

Figure 14:
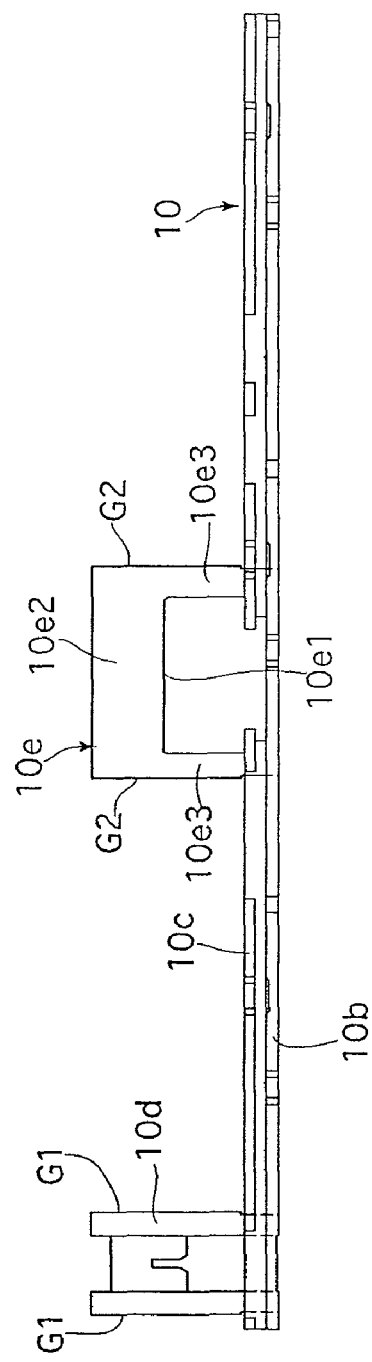
FIG. 14 is a developed plan view of the second linear guide ring.
Figure 15:
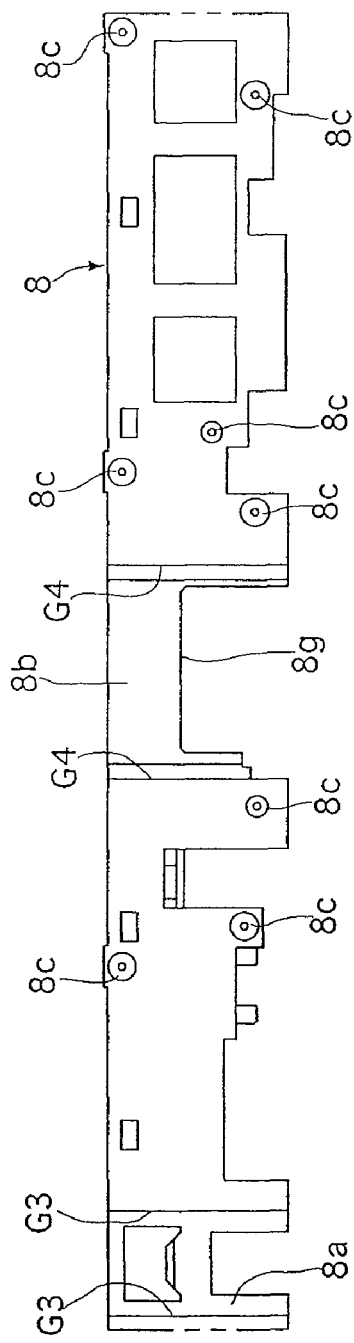
FIG. 15 is a developed plan view of the second lens group moving frame.
Figure 16:
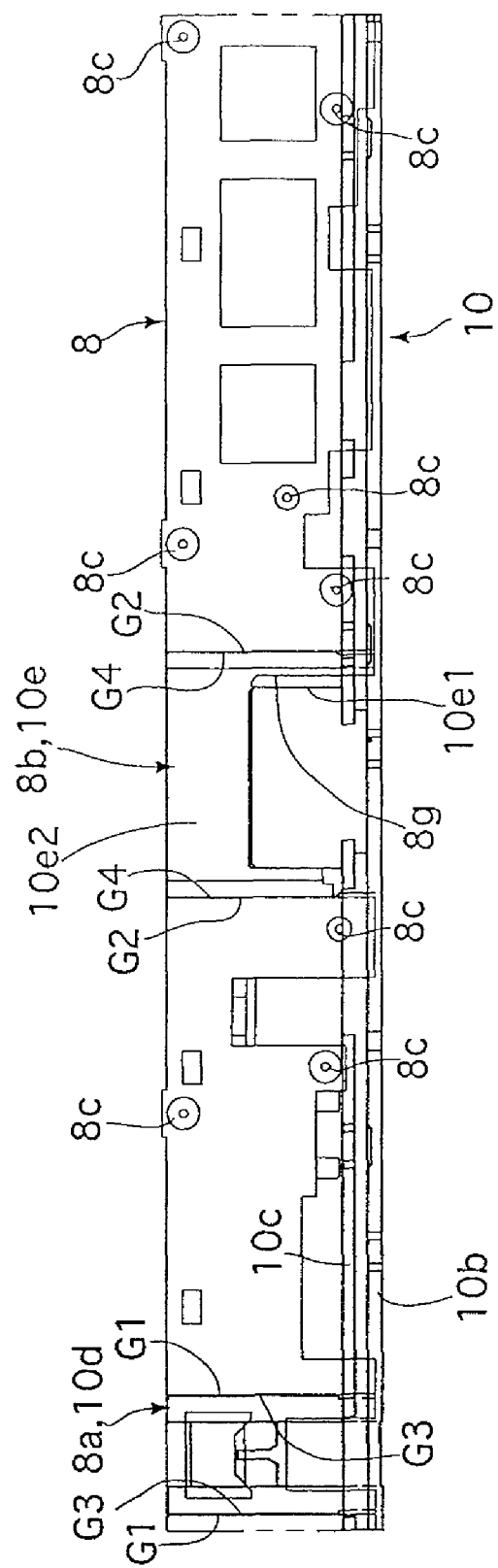
FIG. 16 is a developed plan view of the second linear guide ring and the second lens group moving frame in the fully-retracted state of the zoom lens.

In the above described zoom lens 71, the second lens group moving frame 8 is guided linearly in the optical axis direction by the first linear guide key 10d and the second linear guide key 10e of the second linear guide ring 10. As shown in FIGS. 4, 6, 7 and 14, the second linear guide key 10e is shaped into a partial cylinder which is wider than the first linear guide key 10d in the circumferential direction of the second linear guide ring 10. The second linear guide key 10e is provided in a central portion thereof with an accommodation through-cutout 10e1 formed through the second linear guide key 10e in a radial direction of the second linear guide ring. The second linear guide key 10e is provided, on both sides of the accommodation through-cutout 10e1 in the circumferential direction of the second linear guide ring 10, with a pair of guide bar portions 10e3 having the pair of linear guide surfaces G2, respectively, and is further provided immediately in front of the pair of guide bar portions 10e3 with a bridging portion 10e2 which extends in the circumferential direction of the second linear guide ring 10 to connect the front ends of the pair of guide bar portions 10e3 to each other. As can be understood from FIGS. 9, 11 and 13, the second linear guide key 10e has a circular-arc shape centered about the imaging optical axis Z1 as viewed from the front. In addition, in a developed plan view as shown in FIG. 14, the second linear guide key 10e is in the shape of a substantially rectangle having the accommodation through-cutout 10e1 within the periphery of the second linear guide key 10e, and the accommodation through-cutout 10e1 is also in the shape of a substantially rectangle.

As shown in FIGS. 4, 6 through 13 and 15, the second lens group moving frame 8 is provided, in the second linear guide groove 8b at a circumferential position corresponding to the circumferential position of the accommodation through-cutout 10e1, with a through-cutout 8g. The size of the through-cutout 8g substantially corresponds to the size of the accommodation through-cutout 10e1. Since the second linear guide ring 10 guides the second lens group moving frame 8 linearly in the optical axis direction, the relative position between the through-cutout 8g and the accommodation through-cutout 10e1 in the circumferential direction about the imaging optical axis Z1 does not vary. On the other hand, the relative position between the through-cutout 8g and the accommodation through-cutout 10e1 in the optical axis direction varies by movement of the second lens group moving frame 8 relative to the second linear guide ring 10 in the optical axis direction.

Additionally, as shown in FIGS. 4, 6 through 9 and 17, the cam ring 11 is provided on an inner peripheral surface thereof with an accommodation recess 11g. The size of the accommodation recess 11g substantially corresponds to the size of the accommodation through-cutout 10e1; however, the relative position between the accommodation recess 11g and the accommodation through-cutout 10e1 in the circumferential direction about the imaging optical axis Z1 and the relative position between the accommodation recess 11g and the accommodation through-cutout 10e1 in the optical axis direction each vary according to the extension/retraction state (position) of the zoom lens 71 because the second lens group moving frame 8 is moved in the optical axis direction by a rotation of the cam ring 11 relative to the second lens group moving frame 8 as described above.

More specifically, when the second lens group moving frame 8 is in an operating position (see FIGS. 2, 3, 12 and 13) which corresponds to a ready-to-photograph state of the zoom lens 71, positions of the accommodation through-cutout 10e1 of the second linear guide ring 10 and the through-cutout 8g of the second lens group moving frame 8 in the optical axis direction do not exactly coincide with each other; moreover, circumferential positions of the accommodation through-cutout 10e1 of the second linear guide ring 10 and the accommodation recess 11g of the cam ring 11 about the imaging optical axis Z1 do not coincide with each other, while positions of the accommodation through-cutout 10e1 of the second linear guide ring 10 and the accommodation recess 11g of the cam ring 11 in the optical axis direction do not coincide with each other, either. On the other hand, when the second lens group moving frame 8 is in the retracted position (see FIGS. 1, 8, 9, 10 and 11) which corresponds to the retracted state of the zoom lens 71, the position of the through-cutout 8g coincides with the position of the accommodation through-cutout 10e1 of the second linear guide ring 10 in the optical axis direction so that the through-cutout 8g and the accommodation through-cutout 10e1 are communicatively connected to each other in a radial direction to form a single radially cut-out portion. When the second lens group moving frame 8 is in the retracted position, the circumferential positions of the accommodation recess 11g of the cam ring 11 and the radially cut-out portion (constituting the through-cutout 8g and the accommodation through-cutout 10e1) coincide with each other while the positions of the accommodation recess 11g of the cam ring 11 and this radially cut-out portion also coincide with each other in the optical axis direction, in a manner so that the accommodation recess 11g is positioned radially outside the accommodation through-cutout 10e1.

Figure 10:
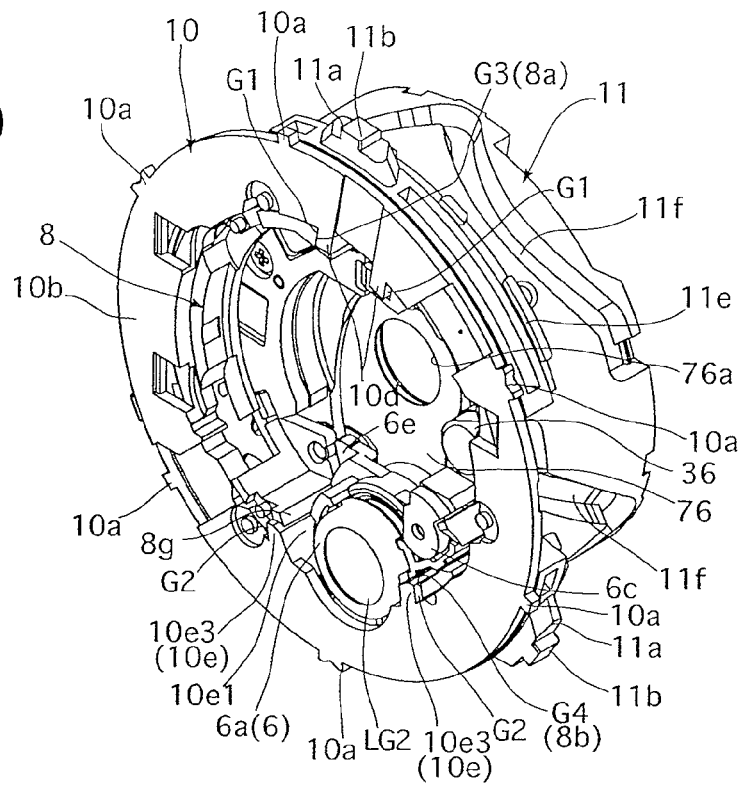
FIG. 10 is a rear perspective view of the elements shown in FIG. 8, in which the second lens frame is added, showing these elements in the retracted state of the zoom lens.
Figure 11:
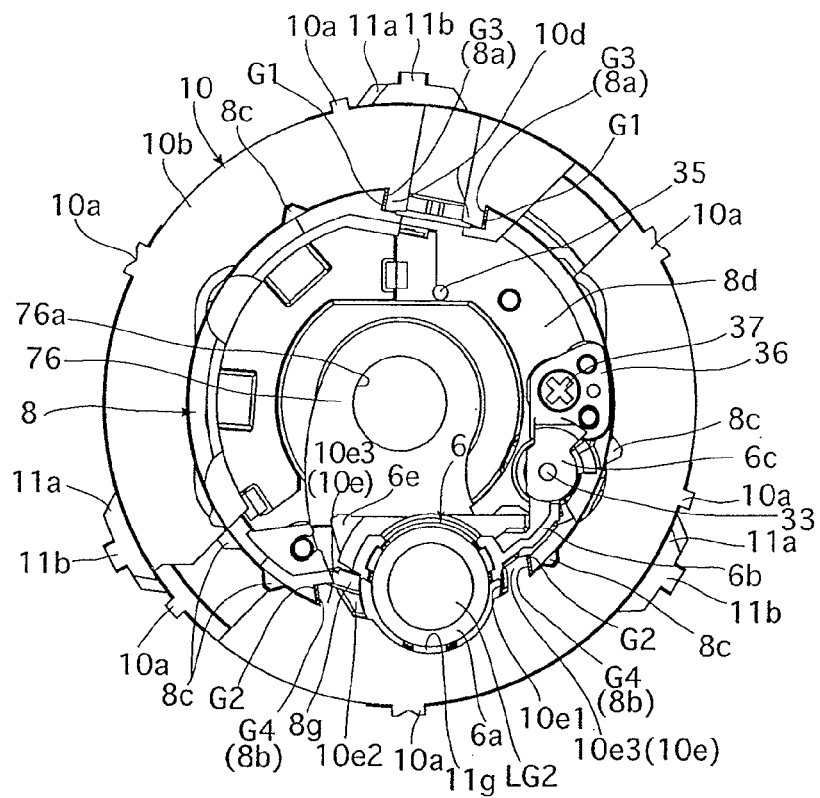
FIG. 11 is a rear elevational view of the elements shown in FIG. 10.
Figure 12:
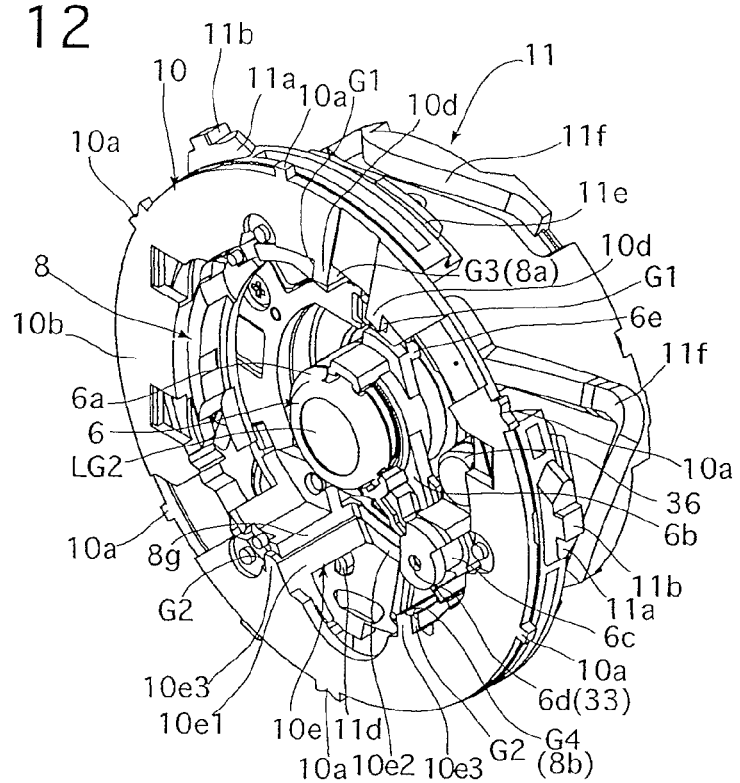
FIG. 12 is a rear perspective view of the elements shown in FIG. 10, showing a state of these elements after the transition from the retracted state to a ready-to-photograph state of the zoom lens.
Figures 17, 18:
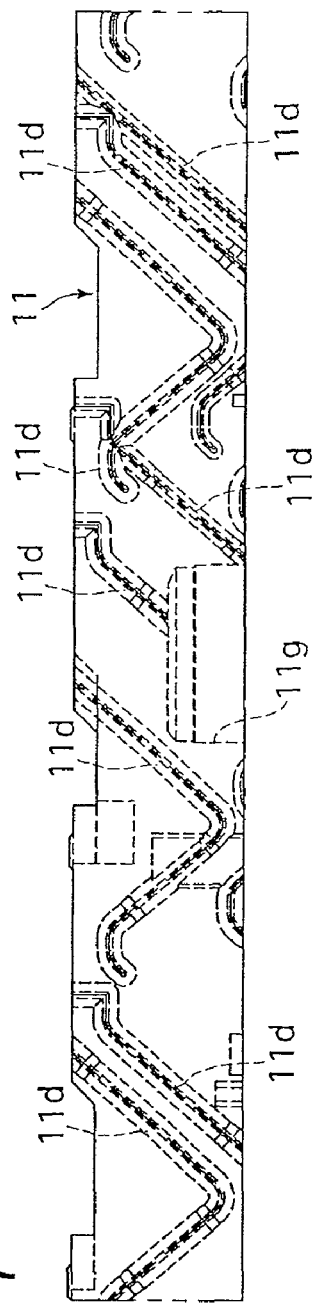
FIG. 17 is a developed plan view of the cam ring.
FIG. 18 is a developed plan view of the second linear guide ring, the cam ring and the second lens frame in the fully-retracted state of the zoom lens.

As described above, in the retracted state of the zoom lens 71, the second lens frame 6 rotates within the second lens group moving frame 8 about the second lens group pivot shaft 33 to the off-axis displaced position, in which the optical axis Z2 of the second lens group LG2 is eccentrically positioned with respect to the imaging optical axis Z1. Upon such rotation of the second lens frame 6, a part of the cylindrical lens holder portion 6a of the second lens frame 6 enters the aforementioned radially cut-out portion, which is formed by the through-cutout 8g and the accommodation through-cutout 10e1, and passes therethrough to enter the accommodation recess 11g that is positioned radially outside the radially cut-out portion, thereby being accommodated in the accommodation recess 11g as shown in FIGS. 10, 11 and 18. With this structure, the second lens group LG2 can be accommodated with a high degree of space-utilization efficiency while the diameters of the second lens group moving frame 8, the second linear guide ring 10 and the cam ring 11 can be reduced, which achieves miniaturization of the zoom lens 71.

Specifically, regarding the second linear guide ring 10, the accommodation through-cutout 10e1 that is formed in the second linear guide key 10e is used as space for accommodating the second lens group LG2 (the cylindrical lens holder portion 6a), and this configuration has merits which will be discussed hereinafter. First of all, in an annular linear guide member such as the second linear guide ring 10, it is desirable that the annular linear guide member be provided at different circumferential positions with a plurality of linear guide portions to ensure stability and accuracy for supporting the second lens group moving frame 8 when the annular linear guide member guides the second lens group moving frame 8 linearly in the optical axis direction. On the other hand, in the second lens group moving frame 8 that is linearly guided by the second linear guide ring 10, it is difficult to secure sufficient circumferential space for the installation of the linear guide portions because the second lens group pivot shaft 33, the shutter unit 76, etc., are installed in the second lens group moving frame 8 in a compact manner. In the present embodiment of the zoom lens 71, such a plurality of linear guide portions are provided as two members: the first linear guide key 10d and the second linear guide key 10e, which makes it possible to secure a wide circumferential space between the first linear guide key 10d and the second linear guide key 10e compared to the case where, e.g., three linear guide keys are arranged at equi-angular intervals of 120 degrees in a circumferential direction, thus making it possible to achieve a compact component arrangement with a high degree of space-utilization efficiency while retaining miniaturization of the second lens group moving frame 8. In addition, utilizing part of the space for the second linear guide key 10e as space for retraction of the second lens group LG2 makes it possible to efficiently utilize the remaining circumferential space in the second lens group moving frame 8.

Regarding the second linear guide key 10e, the distance between the pair of linear guide surfaces G2 in the circumferential direction of the second linear guide ring 10 is widened so that the second linear guide key 10e can include the accommodation through-cutout 10e1 between the pair of linear guide surfaces G2 in the circumferential direction of the second linear guide ring 10. This makes it possible for the second linear guide key 10e, that serves as the linear guide portion for guiding the second lens group moving frame 8, to obtain a high degree of guide stability as compared with a linear guide projection having a narrow circumferential width. Additionally, since the front of the accommodation through-cutout 10e1 of the second linear guide key 10e is closed by the bridging portion 10e2, the second linear guide key 10e has a higher strength than that in the case where the second linear guide key 10e does not have the bridging portion 10e2 and only has the pair of guide bar portions 10e3 as two independent key projections. Additionally, the entire part of the second linear guide key 10e that includes the bridging portion 10e2 is formed as part of a circular-arc-shaped wall about the imaging optical axis Z1 as viewed from the front of the zoom lens 71, thus having an arch-shaped structure that excels in strength and is capable of being accommodated between the second lens group moving frame 8 and the cam ring 11 with a high degree of space-utilization efficiency.

Although the second linear guide key 10e includes the pair of linear guide surfaces G2 on the opposite sides of the second linear guide key 10e in the circumferential direction in the above described embodiment of the zoom lens 71, it is possible to change the positions of formation of the pair of linear guide surfaces G2. For instance, it is possible that each guide bar portion 10e3 of the second linear guide key 10e be provided, on an inner peripheral surface thereof that faces the second lens group moving frame 8, with at least one radial projection or groove while the second lens group moving frame 8 is provided on an outer peripheral surface thereof with corresponding at least one radial groove or projection which is slidably engaged with the radial projection or groove of the guide bar portion 10e3. This structure makes it possible to increase the number of engaging portions for linearly guiding the second lens group moving frame 8, thus making it possible to improve the aforementioned stability and accuracy for supporting the second lens group moving frame 8. In addition, if the height of the radial projection and the depth of the radial groove that are engaged with each other can be made equal to each other, a substantial increase in radial size of each of the second lens group moving frame 8 and the second linear guide key 10e can be prevented from occurring, so that the compactness of the zoom lens 71 is maintained.

Figure 19:
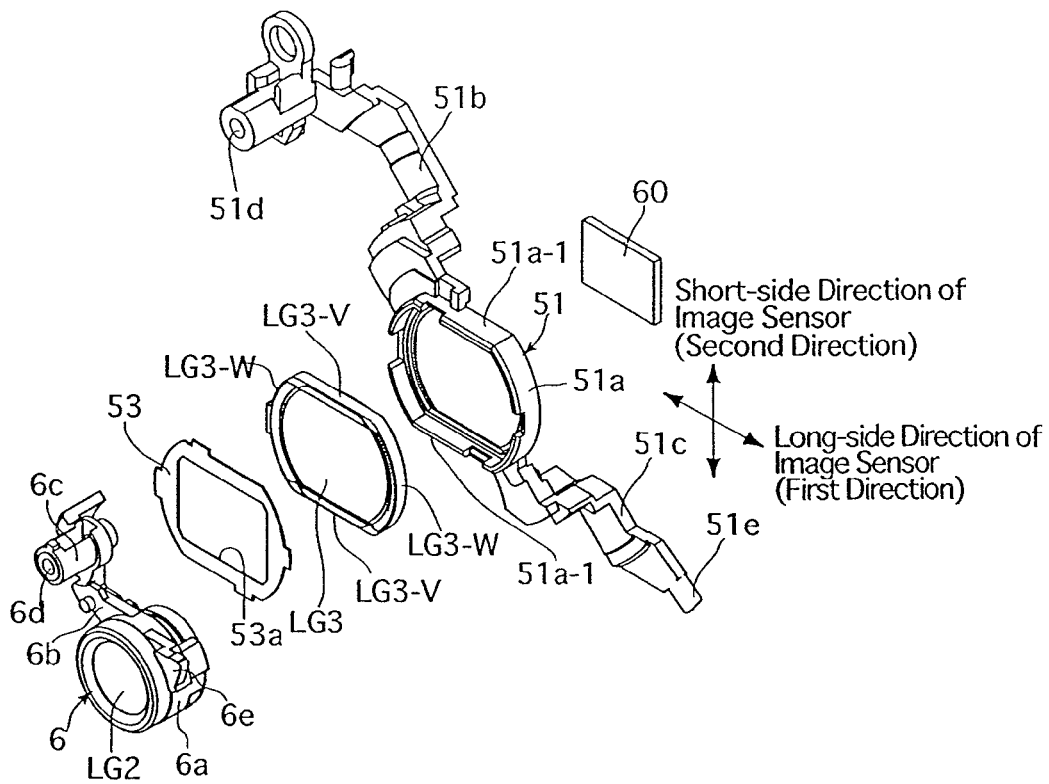
FIG. 19 is a perspective view of an AF lens frame, the second lens frame and an image sensor, showing a disassembled state of the AF lens frame and the positional relationship between the AF lens frame and each of the second lens frame and an image sensor that are positioned in front and rear of the AF lens frame, respectively.
Figure 20:
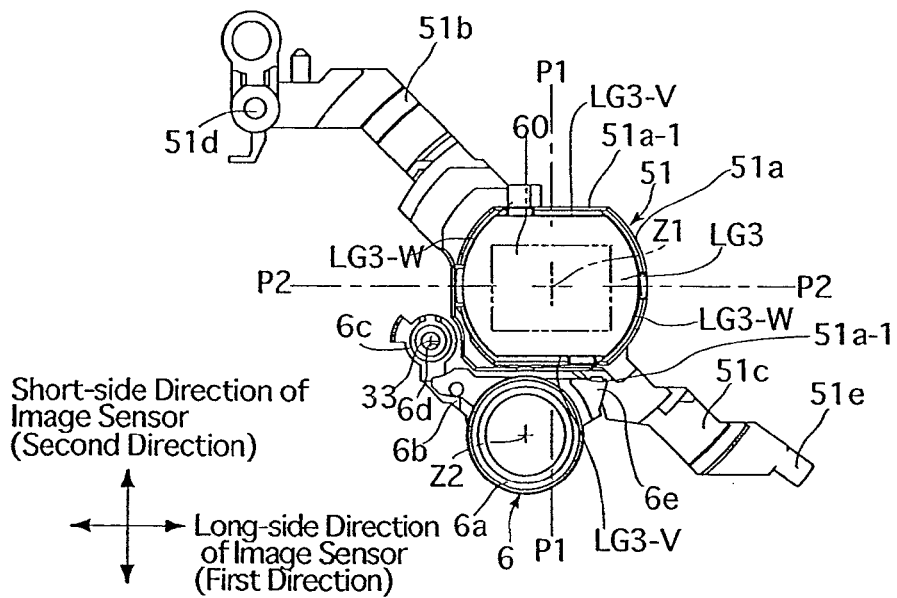
FIG. 20 is a front elevational view of the second lens frame, the AF lens frame and the image sensor in the fully-retracted state of the zoom lens, showing the positional relationship therebetween.

The above described embodiment of the zoom lens 71 is also characterized by the retracting structure thereof for retracting the second lens group LG2 and the third lens group LG3. Such characteristics of the zoom lens 71 will be discussed hereinafter. As shown in FIGS. 19 and 20, the image sensor 60 has a laterally-elongated rectangular imaging surface that includes two long sides and two short sides, wherein the two long sides are elongated in the horizontal direction (first direction) and the two short sides are elongated in a direction (second direction) substantially orthogonal to the horizontal direction. To correspond with this shape of the image sensor 60, the third lens group LG3 is shaped to have a non-circular shape (double D-cut shape), i.e., the third lens group LG3 is shaped in a manner such that upper and lower parts of the third lens group LG3 (upper and lower parts of the rim of the third lens group LG3 that are positioned along the two long sides of the image sensor 60 which correspond to the upper and lower long sides of the image sensor 60 are removed. More specifically, the third lens group LG3 is provided with a pair of (upper and lower) long-side straight edges (linear contours) LG3-V that are substantially parallel to the long sides of the image sensor 60, and is further provided with a pair of short-side circular arcuate edges LG3-W which respectively connect the pair of (upper and lower) long-side straight edges LG3-V to each other, and the outer edge of the third lens group LG3 is formed in a non-circular shape by the pair of long-side straight edges LG3-V and the pair of short-side circular arcuate edges LG3-W. The pair of short-side circular arcuate edges LG3-W are formed as portions of a reference circle LG3-Q lying on a plane orthogonal to the optical axis Z1 (see FIG. 22) of the third lens group LG3 when it is assumed that the aforementioned upper and lower parts (D-cut portions) of the third lens group LG3 that correspond to the upper and lower long sides of the image sensor 60 are not removed, and the pair of long-side straight edges LG3-V are formed as straight edges which extend within the reference circle LG3-Q. To correspond to the shape of the third lens group LG3, the lens holder portion 51a of the AF lens frame 51 is also formed in a ring-shaped portion having a non-circular shape (double D-cut shape) defined by a pair of (upper and lower) cut away portions 51a-1 which are formed along the long-side straight edges LG3-V of the third lens group LG3, so that the upper and lower sides of the lens holder portion 51a (i.e., contours of the upper and lower cut away portions 51a-1) are substantially parallel to the long sides of the image sensor 60. In addition, a lens retaining plate 53 with a laterally-elongated rectangular opening 53a is installed onto the front of the lens holder portion 51a to retain the third lens group LG3 between the lens retaining plate 53 and the lens holder portion 51a, and is also formed in a non-circular shape (double D-cut shape) in a similar manner as shown in FIGS. 19 through 22. On the other hand, the second lens group LG2 is circular in shape, i.e., does not include portions like the aforementioned removed portions (D-cut portions) on the outer edge of the second lens group LG2.

Figure 21:
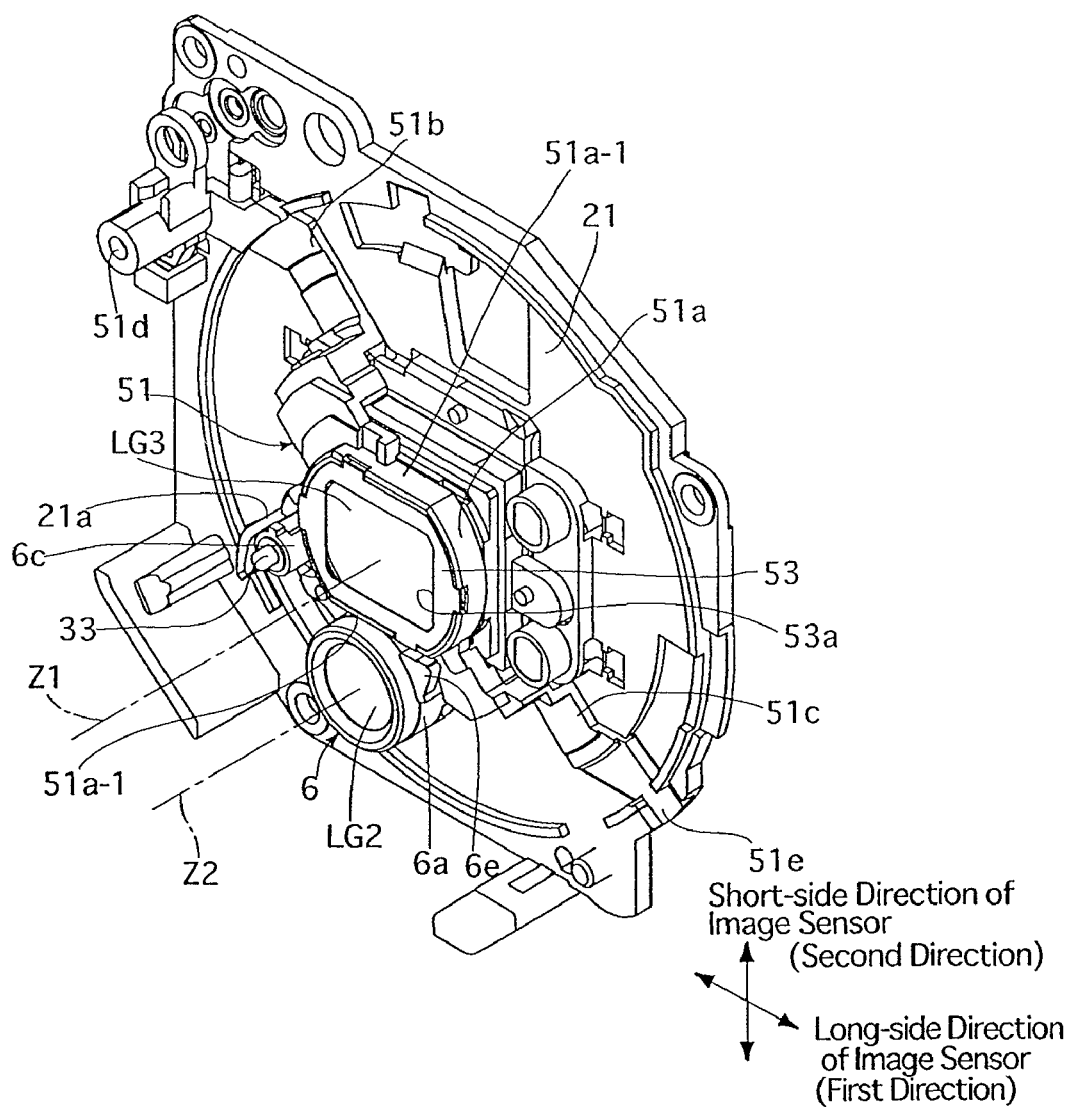
FIG. 21 is a perspective view of the second lens frame, the AF lens frame and an image sensor holder in the fully-retracted state of the zoom lens, showing the positional relationship therebetween.
Figure 22:
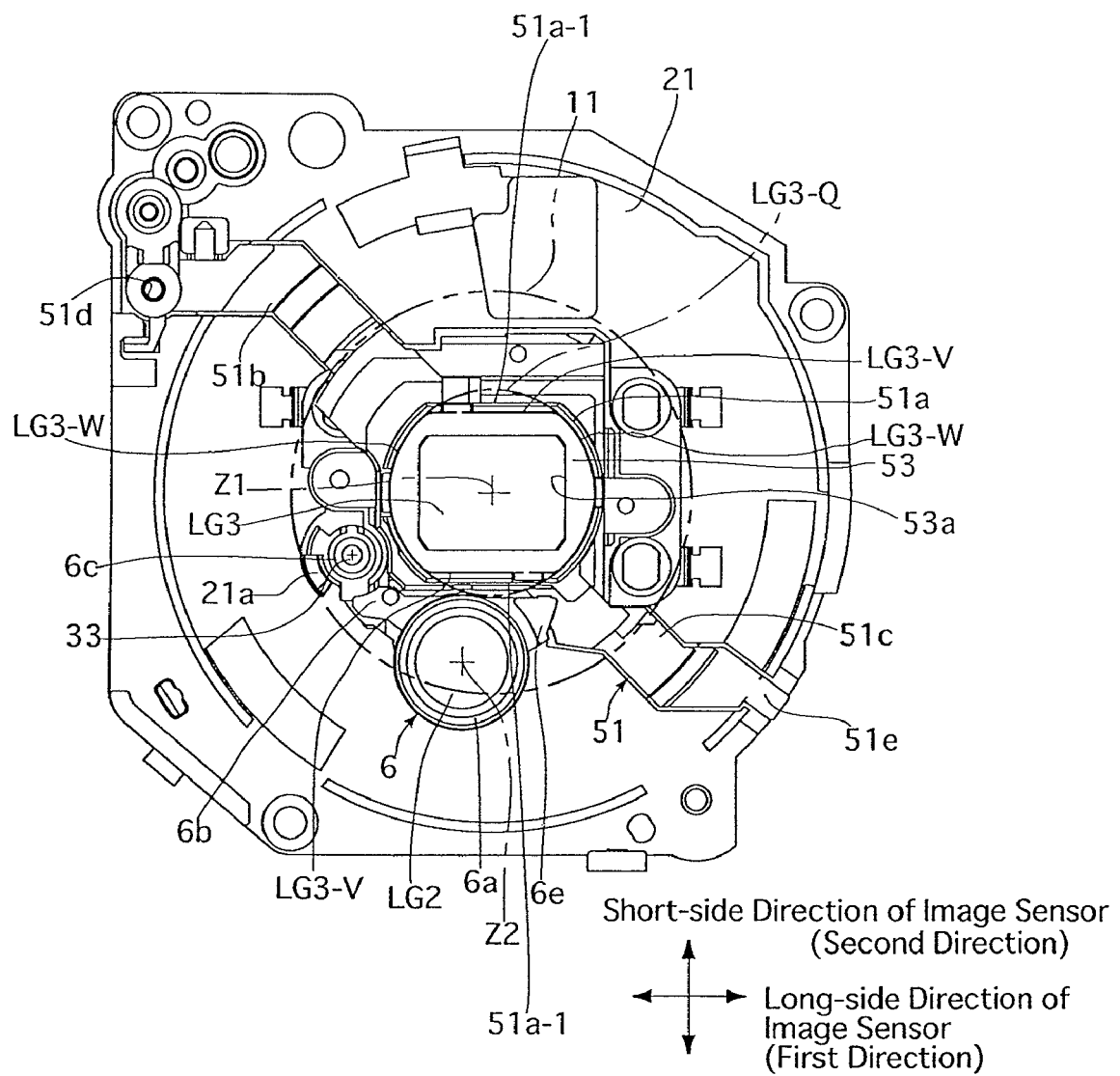
FIG. 22 is a front elevational view of the second lens frame, the AF lens frame and the image sensor holder in the fully-retracted state of the zoom lens, showing the positional relationship therebetween.
Figure 23:
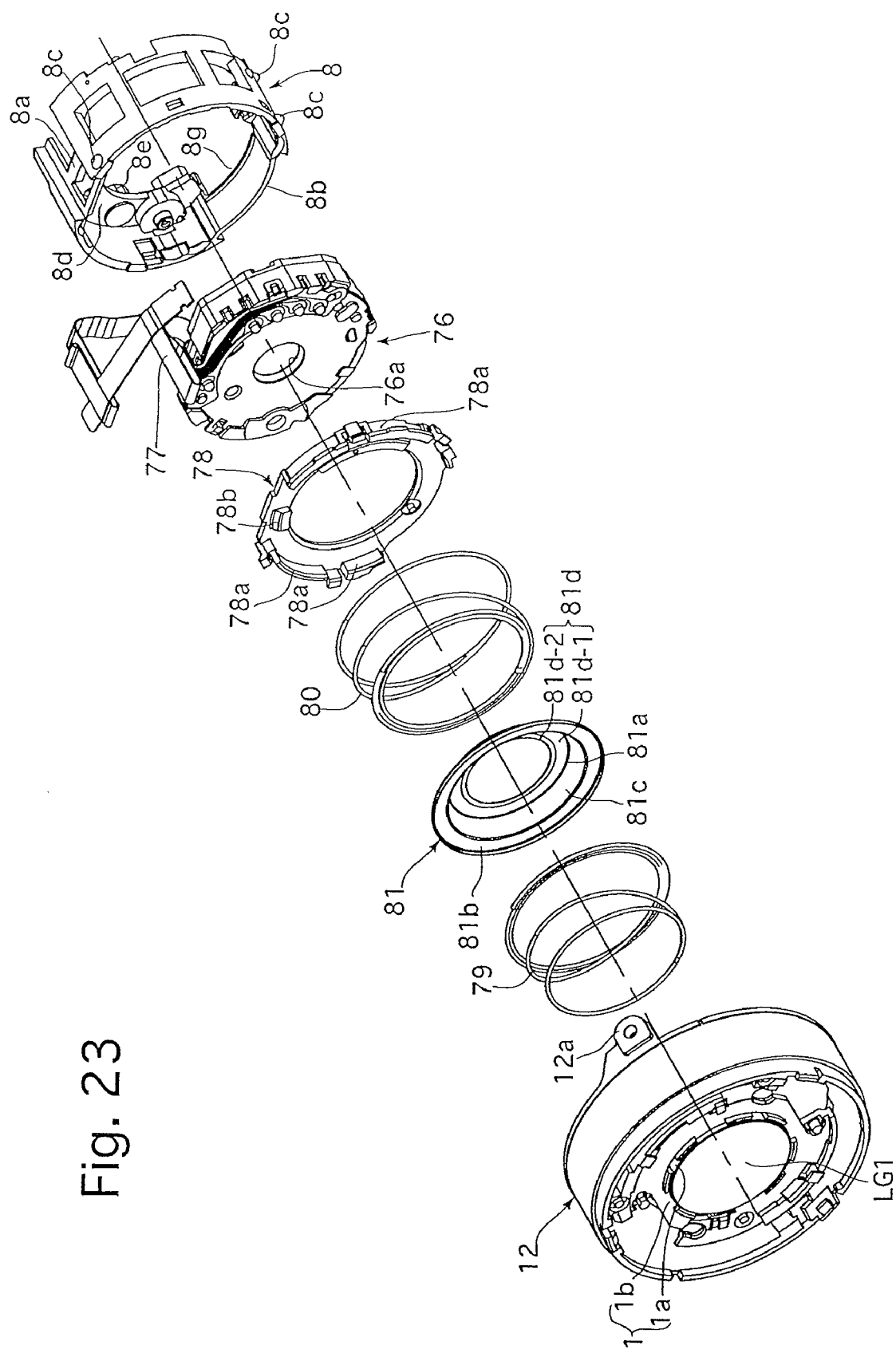
FIG. 23 is an exploded perspective view of a light shield structure provided between the first and second lens groups of the zoom lens.

FIGS. 20 through 22 show the positional relationship between the second lens group LG2 (the second lens frame 6) and the third lens group LG3 (the AF lens frame 51) in the retracted state of the zoom lens 71. As described above, when the zoom lens 71 is retracted to the retracted position, the second lens group LG2 is radially retracted into space below the third lens group LG3 so that part of the second lens group LG2 is positioned in an axial range substantially identical to an axial range in the optical axis direction in which the third lens group LG3 is positioned. At this stage, as shown in FIG. 20 that is a front elevational view of the second lens frame 6 and the AF lens frame 51, etc., the second lens group LG2 (the cylindrical lens holder portion 6a of the second lens frame 6) in the off-axis displaced position is partly positioned in the removed portion (lower D-cut portion) of the third lens group LG3 and the cut away portion 51a-1 (lower D-cut portion) of the lens holder portion 51a so as to be immediately below the lower long-side straight edge LG3-V of the third lens group LG3, and the optical axis Z2 of the second lens group LG2 is offset leftward (toward the side where the guide hole 51d is positioned) from an on-axis plane P1 which passes through the optical axis of the third lens group LG3 (i.e., the imaging optical axis Z1) and which is parallel to the short sides of the image sensor 60. Additionally, the second lens group pivot shaft 33, about which the second lens frame 6 is pivoted, is positioned adjacent to one of the pair of short-side circular arcuate edges LG3-W which is closer to the optical axis Z2 of the second lens group LG2 in the off-axis displaced position. In other words, the position of the second lens group pivot shaft 33 is set in one of the two lateral sides in the long-side direction of the third lens group LG3 (the left lateral side with respect to FIG. 20) which is closer to the optical axis Z2 of the second lens group LG2 in the off-axis displaced position. In addition, the second lens group pivot shaft 33 is offset downward (toward the off-axis displaced position side of the second lens group LG2) from an on-axis plane P2 which passes through the optical axis of the third lens group LG3 (i.e., the imaging optical axis Z1) and which is parallel to the long sides of the image sensor 60.

In the above described structure, when the second lens group LG2 is in the off-axis displaced position, the second lens group LG2 (the cylindrical lens holder portion 6a) that is greater in diameter than the second lens group pivot shaft 33 (the pivoted cylindrical portion 6c) is positioned adjacent to one of the pair of long-side straight edges LG3-V (the lower long-side straight edge LG3-V with respect to FIG. 20), which makes the second lens group pivot shaft 33 (the pivoted cylindrical portion 6c), which is smaller in diameter than the second lens group LG2 (the cylindrical lens holder portion 6a), positioned adjacent to one of the pair of short-side circular arcuate edges LG3-W (the left short-side circular arcuate edge LG3-W with respect to FIG. 20), and accordingly, the second lens group LG2 (the cylindrical lens holder portion 6a) and the second lens group pivot shaft 33 (the pivoted cylindrical portion 6c) are retracted with a high degree of space-utilization efficiency on both of the long and short sides of the third lens group LG3. Specifically, the cylindrical lens holder portion 6a of the second lens frame 6 is positioned closely to the third lens group LG3 up to a position where the cylindrical lens holder portion 6a would otherwise interfere with either the reference circle LG3-Q of the third lens group LG3 or the lens holder portion 51a of the AF lens frame 51 that holds the third lens group LG3 if it is assumed that the aforementioned upper and lower parts (D-cut portions) of the third lens group LG3 are not removed and that the lens holder portion 51a is not provided with the cut away portions 51a-1. Accordingly, a high degree of effectiveness is obtained in miniaturization of the retracting structure in the short-side direction of the image sensor 60.

Additionally, since the optical axis Z2 of the second lens group LG2 in the off-axis displaced position is offset from the on-axis plane P1 that is parallel to the short sides of the image sensor 60, the position of the second lens group pivot shaft 33 can be positioned closely to the on-axis plane P1 (to the imaging optical axis Z1), which achieves further compactification of the zoom lens 71. As a precondition of this achievement, the position of the second lens group pivot shaft 33, about which the pivoted cylindrical portion 6c of the second lens frame 6 is pivoted, needs to be set in a plane orthogonal to the imaging optical axis Z1 so as not to overlap the sensor package including the image sensor 60 on the image sensor holder 21. In addition, the condition that each of the pivoted cylindrical portion 6c and the swing arm portion 6b is located at a position that does not interfere with the lens holder portion 51a of the AF lens frame 51 also needs to be satisfied.

Unlike the above described embodiment, assuming that the optical axis Z2 of the second lens group LG2 in the off-axis displaced position is located on the on-axis plane P1 even though such a condition is satisfied, the position of the second lens group pivot shaft 33 becomes farther from the imaging optical axis Z1 than that shown in the drawings of the present embodiment, or the turning radius of the second lens frame 6 (the distance from the second lens group pivot shaft 33 to the optical axis Z2) increases. If so, the support structure for the second lens group LG2 will not be positioned within the inner diameter of the cam ring 11 that is shown by a two-dot chain line in FIG. 22. In contrast, according to the structure of the above described embodiment, the second lens group LG2 and the support structure therefor can be retracted and accommodated within the limited space without an increase in size of the cam ring 11. Although the cylindrical lens holder portion 6a of the second lens frame 6 partly projects radially outwards from the inner circumferential position (inner diameter) of the cam ring 11 as shown in FIG. 22, this partly projecting portion of the cylindrical lens holder portion 6a does not interfere with the cam ring 11 because this partly projecting portion is a portion which is accommodated in the accommodation recess 11g of the cam ring 11 through the through-cutout 8g and the accommodation through-cutout 10e1.

Other features of the zoom lens 71, specifically features of the light shield structure provided between the first lens group LG1 and the second lens group LG2 will be discussed hereinafter. As shown in FIGS. 1 through 3, and 23, the first lens frame 1 that holds the first lens group LG1 is provided with a cylindrical lens holder portion 1a and a radial wall portion 1b. The cylindrical lens holder portion 1a is formed to correspond to the shape of the outer peripheral shape of the first lens group LG1 and has a center axis coincident with the imaging optical axis Z1, and the radial wall portion 1b projects radially outwards from the cylindrical lens holder portion 1a. The zoom lens 71 is provided inside the second lens group moving frame 8 with a spring contacting ring 78 which is fixed to the front of the shutter unit 76. The spring contacting ring 78 is provided on the front thereof with a plurality of flange portions 78a and a spring stabilizing projection 78b (see FIG. 23). Each flange portion 78a is in the shape of a circular arc about the imaging optical axis Z1 and projects forward from the outer edge of the spring contacting ring 78, and the spring stabilizing projection 78b projects forward from a portion of the front surface of the spring contacting ring 78 at a position slightly radially inside of a circle about the imaging optical axis Z1 on which the plurality of flange portions 78a lie (i.e., at a position slightly closer to the imaging optical axis Z1 than each flange portion 78a).

The zoom lens 71 is provided immediately behind the radial wall portion 1b with a first spring (front spring) 79 in the form of a compression coil spring the front end of which is in contact with a rear surface of the radial wall portion 1b. The zoom lens 71 is provided immediately in front of the spring contacting ring 78 with a second spring (rear spring) 80 made of a compression coil spring the rear end of which is in contact with a front surface of the spring contacting ring 78 on an annular area thereon which extends circumferentially about the imaging optical axis Z1 between each flange portion 78a and the spring stabilizing projection 78b. Each of the first spring 79 and the second spring 80 is a truncated-conical-shaped compression coil spring, the diameter of which increases toward the rear of the optical axis direction (rightward as viewed in FIGS. 1 through 3), and the second spring 80 is greater in diameter than the first spring 79.

The zoom lens 71 is provided between the rear end of the first spring 79 and the front end of the second spring 80 with an annular light shield member 81 which is supported to float therebetween while achieving a balance between the spring forces of the first spring 79 and the second spring 80. The annular light shield member 81 is an annular member about the imaging optical axis Z1 and provided with a radial flange (radial wall portion/first radial flange portion) 81a, a radial flange (radial wall portion/second radial flange portion) 81b, an annular connecting portion 81c and a light shield wall 81d. The radial flange 81a is in contact with the rear end of the first spring 79. The radial flange 81b is positioned in front of the radial flange 81a in the optical axis direction, greater in diameter than the radial flange 81a (to be positioned radially farther from the optical axis Z1 than the radial flange 81a), and in contact with the front end of the second spring 80. The annular connecting portion 81c has a cylindrical shape about the imaging optical axis Z1 and the front and rear ends of the annular connecting portion 81c are connected to the radial flanges 81b and 81a, respectively. The light shield wall 81d is positioned radially inside the radial flange 81a. The light shield wall 81d is provided with a truncated conical portion 81d-1 which extends from the inner edge of the radial flange 81a and the diameter of which decreases toward the rear of the optical axis direction so as to gradually approach the imaging optical axis Z1, and a rear end ring portion 81d-2 which is fixed to the rear end of the truncated conical portion 81d-1 and lies in a plane substantially orthogonal to the imaging optical axis Z1. The first spring 79 and the second spring 80 are held to be substantially concentric with each other (to make the axes of the first spring 79 and the second spring 80 coincident with each other) with the outer peripheral surface of the rear end of the first spring 79 and the inner peripheral surface of the front end of the second spring 80 being in contact with the inner and outer peripheral surfaces of the annular connecting portion 81c, respectively. Additionally, the first spring 79 is held to be substantially concentric with the first lens frame 1 with the front end of the first spring 79 being engaged with an annular stepped portion formed by the border between the cylindrical lens holder portion 1a and the radial wall portion 1b of the first lens frame 1, while the second spring 80 is held to be substantially concentric with the second lens group moving frame 8, to which the spring contacting ring 78 is fixed via the shutter unit 76, with the rear end of the second spring 80 being engaged in between the spring stabilizing projection 78b and the plurality of flange portions 78a of the spring contacting ring 78.

In the above described light shield structure, each of the first spring 79 and the second spring 80 expands and contracts in accordance with variations in the relative position between the first lens frame 1 and the second lens group moving frame 8 in the optical axis direction so that the annular shield member 81 is held at a predetermined position between the first lens group LG1 and the second lens group LG2. More specifically, in the retracted state of the zoom lens 71, in which the distance between the first lens frame 1 and the second lens group moving frame 8 becomes minimum as shown in FIG. 1, the degree of compression of each of the first spring 79 and the second spring 80 becomes maximum, and the annular light shield member 81 is accommodated in a space (annular space) radially outside the cylindrical lens holder portion 1a of the first lens frame 1 (i.e., outside the first lens group LG1). In a ready-to-photograph state of the zoom lens 71 set at the wide-angle extremity, in which the first lens frame 1 and the second lens group moving frame 8 are some distance away from each other as shown in FIG. 2, the annular light shield member 81 is held in space between the first lens group LG1 and the second lens group LG2 and shields rays of light which would otherwise pass through the first lens group LG1 and subsequently enter around toward the radially outer of the second lens group moving frame 8 without passing through the second lens group LG2. The diameter and the shape of the annular light shield member 81 (especially the light shield wall 81d) are predetermined so that the harmful-light shield efficiency thereof becomes highest in the state shown in FIG. 2. In addition, the axial length and the spring force of each of the first spring 79 and the second spring 80 are also predetermined so that the annular light shield member 81 is held at a position in the optical axis direction where the harmful-light shield efficiency of the annular light shield member 81 becomes highest in the state shown in FIG. 2. Changing the focal length of the zoom lens 71 from the wide-angle extremity state shown in FIG. 2 toward the telephoto extremity state shown in FIG. 3 causes the first lens frame 1 and the second lens group moving frame 8 to approach each other. When the zoom lens 71 is set at the telephoto extremity as shown in FIG. 3, the annular light shield member 81 is accommodated in space radially outside the cylindrical lens holder portion 1a of the first lens frame 1, similar to the case where the zoom lens 71 is in the retracted state. When the zoom lens 71 is set at the telephoto extremity, the first lens group LG1 and the second lens group LG2 are close to each other and harmful rays of light which may travel toward the image sensor 60 without passing through the second lens group LG2 can be shielded by the shutter unit 76 and others, and accordingly, no problem arises even if the annular light shield member 81 is accommodated in space radially outside the cylindrical lens holder portion 1a of the first lens frame 1. In addition, the first lens group LG1 and the second lens group LG2 can be brought close to each other without interfering with each other by the above described accommodating structure in which the annular light shield member 81, the first spring 79 and the second spring 80 are accommodated in space radially outside the cylindrical lens holder portion 1a of the first lens frame 1, so that this accommodating structure excels in space-utilization efficiency and may not add constraints to the optical performance of the zoom lens 71.

As described above, according to the above described embodiment of the light shield structure, the aforementioned harmful rays of light can be reliably shielded even though the light shield structure is simple since the annular light shield member 80 is held in a floating state in a balanced manner between the spring forces of the first spring 79 and the second spring 80.

Figure 24:
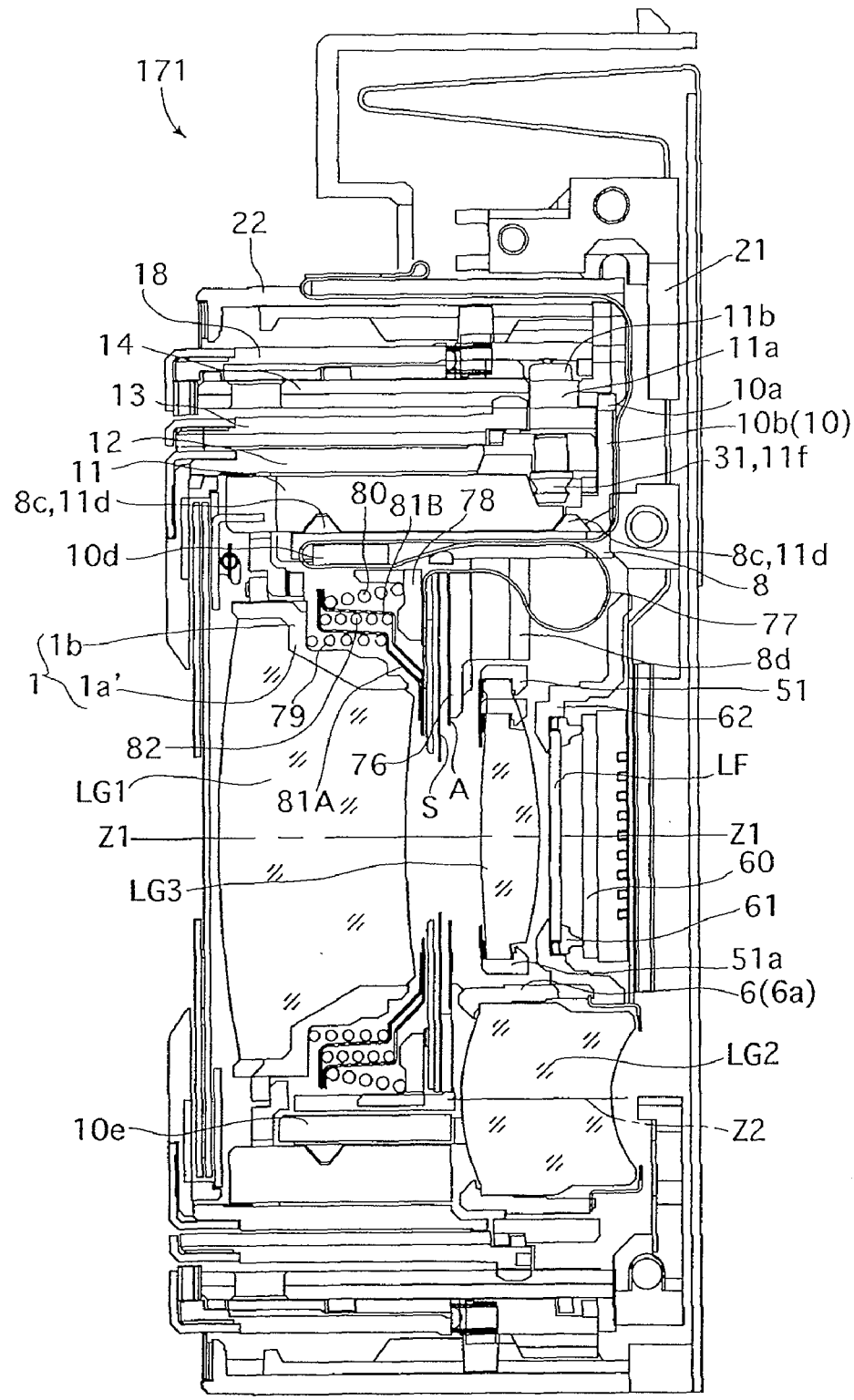
FIG. 24 is an axial cross sectional view of a second embodiment of the zoom lens in the retracted state thereof, in which a plurality of annular light shield members are installed between the first and second lens groups of the zoom lens.
Figure 25:
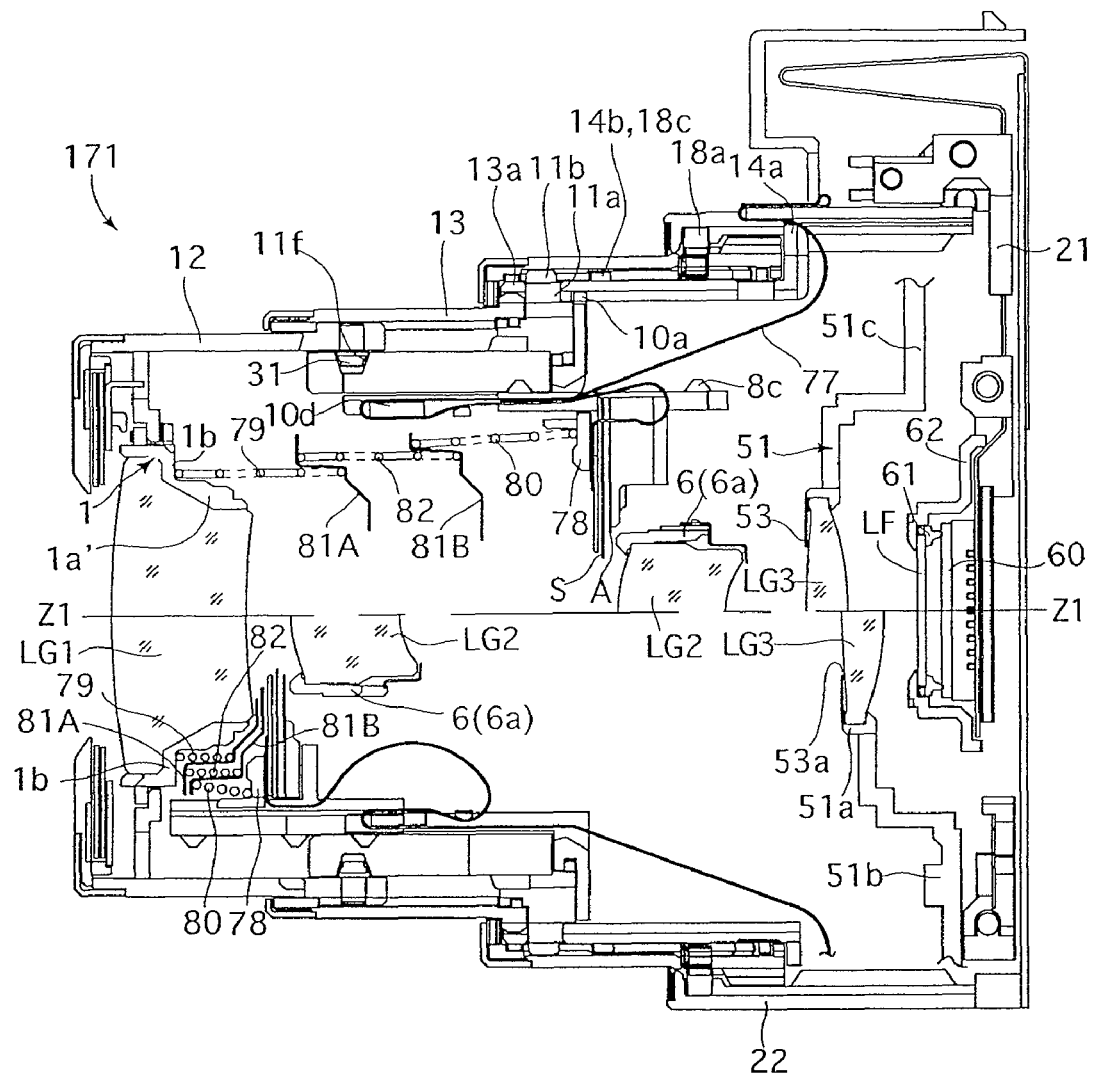
FIG. 25 is an axial cross sectional view of the second embodiment of the zoom lens in a ready-to-photograph state thereof, wherein the upper half above an imaging optical axis shows a state of the zoom lens at the telephoto extremity and the lower half below the imaging optical axis shows a state of the zoom lens at the wide-angle extremity.

The zoom lens 71 can be provided with a plurality of light shield members, e.g., two annular light shield members 81A and 81B as shown in a second embodiment of the zoom lens 171 shown in FIGS. 24 and 25. In FIGS. 24 and 25, elements similar to those of the first embodiment of the zoom lens are designated by the same reference numerals. The zoom lens 171 is provided between the first spring 79 and the second spring 80 with an intermediate spring 82 in the form of a compression coil spring. The front annular light shield member 81A is held between the rear end of the first spring 79 and the front end of the intermediate spring 82, while the rear light shield member 81B is held between the rear end of the intermediate spring 82 and the front end of the second spring 80. In the retracted state of the zoom lens 171 shown in FIG. 24 and also in a state of the zoom lens 171 set at the telephoto extremity as shown by a lower half of the zoom lens 171 shown in FIG. 25, the two annular light shield members 81A and 81B, the first spring 79, the second spring 80 and the intermediate spring 82 are all accommodated in a space (annular space) radially outside a cylindrical lens holder portion 1a' of the first lens frame 1, so that this accommodating structure of the second embodiment of the zoom lens excels in space-utilization efficiency, similar to the accommodating structure of the first embodiment of the zoom lens 71. The cylindrical lens holder portion 1a' has a different shape to that of the cylindrical lens holder portion 1a of the first embodiment so as to accommodate the two annular light shield members 81A and 81B and the three springs 79, 80 and 82 thereabout. In a state of the zoom lens 171 set at the wide-angle extremity as shown by an upper half of the zoom lens 171 shown in FIG. 25, the two annular light shield members 81A and 81b are held in a space between the first lens group LG1 and the second lens group LG2 having a distance between the two annular light shield members 81A and 81B in the optical axis direction with which an appropriate light shield effect can be obtained. Although the two annular light shield members 81A and 81B are installed in the second embodiment of the zoom lens 171, it is possible that more than two annular light shield members be installed.

Although the spring for holding the annular light shield member 81 is in the form of two compression springs (compression coil springs) in the first embodiment of the zoom lens 71 and the spring for holding the two annular light shield members 81A and 81B is in the form of three compression springs (compression coil springs) in the second embodiment of the zoom lens 171, it is possible that each of such compression springs be replaced by an extension coil spring.

Specific structures of the above described first and second embodiments of the zoom lenses 71 and 171 are merely examples which embody the present invention, and the sprit and scope of the present invention are not limited by the above described embodiments.

For instance, although the second lens group LG2 is retracted away from the imaging optical axis Z1 when the zoom lens is fully retracted, the present invention can also be applied to a light shielding structure of an optical device for preventing harmful light from entering between optical elements which do not retract away from an imaging optical axis in such a manner.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A light shielding structure of an optical device, including a plurality of optical elements arranged at different positions in an optical axis direction, said light shielding structure comprising:
    at least one annular light shielding member positioned between two optical elements of said plurality of optical elements to shield harmful light; and
    a plurality of springs held between said two optical elements to be resiliently deformable in said optical axis direction, said plurality of springs including at least two springs, one of which is held between one of said two optical elements and said annular light shielding member while the other of said two springs is held between the other of said two optical elements and said annular light shielding member,
    wherein said annular light shielding member is supported between said two optical elements in a balanced state between the spring forces of said plurality of springs.

2. The light shielding structure according to claim 1, wherein said annular light shielding member comprises at least two annular light shielding members installed between said two optical elements at different positions in said optical axis direction, and
    wherein said plurality of springs include an intermediate spring held between said annular light shielding members to be resiliently deformable in said optical axis direction.

3. The light shielding structure according to claim 2, wherein said at least two annular light shielding members comprise a front annular light shielding member and a rear annular light shielding member positioned behind said front annular light shielding member in said optical axis direction,
    wherein said plurality of springs includes a front spring, said intermediate spring and a rear spring, installed in that order in said optical axis direction,
    wherein said front annular light shielding member is held between a rear end of said front spring and a front end of said intermediate spring, and
    wherein said rear annular light shielding member is held between a rear end of said intermediate spring and a front end of said rear spring.

4. The light shielding structure according to claim 1, wherein said light shielding structure is incorporated in a retractable lens barrel,
    wherein said two optical elements are movable relative to each other in said optical axis direction,
    wherein said two optical elements are positioned closely to each other in said optical axis direction so that said annular light shielding member is held in a space radially outside one of said two optical elements when said retractable lens barrel is in a retracted state, in which a photographing operation is not performed, and
    wherein said two optical elements move away from each other to increase a distance therebetween in said optical axis direction so that said annular light shielding member is positioned between said two optical elements when said retractable lens barrel moves from said retracted state to a ready-to-photograph state.

5. The light shielding structure according to claim 1, wherein said plurality of optical elements form a zoom optical system which varies a focal length according to changes in distance between said two optical elements, and
    wherein said annular light shielding member is held in a space radially outside one of said two optical elements when said two optical elements closely approach each other in a zooming range thereof.

6. The light shielding structure according to claim 1, wherein one of said plurality of optical elements comprises a shutter unit.

7. The light shielding structure according to claim 1, wherein said annular light shielding member comprises at least one radial flange portion which lies in a plane substantially orthogonal to said optical axis and with which an end of said plurality of springs is in contact.

8. The light shielding structure according to claim 7, wherein said radial flange portion of said annular light shielding member comprises:
    a first radial flange portion with which a rear end of a spring of said plurality of springs which is positioned in front of said first radial flange portion is in contact; and
    a second radial flange portion with which a front end of another spring of said plurality of springs which is positioned behind said first radial flange portion is in contact.

9. The light shielding structure according to claim 8, wherein said first radial flange portion and said second radial flange portion are provided at different positions in said optical axis direction, and
    wherein said annular light shielding member further comprises an annular connecting portion which has a center axis thereof substantially on said optical axis and which connects said first radial flange portion and said second radial flange portion to each other.

10. The light shielding structure according to claim 9, wherein said first radial flange portion is provided at a position more rearward in said optical axis direction than that of said second radial flange portion.

11. The light shielding structure according to claim 7, wherein said annular light shielding member comprises a truncated conical portion positioned radially inside said radial flange portion and formed so that a diameter of said truncated conical portion decreases rearwardly in said optical axis direction.

12. The light shielding structure according to claim 1, wherein each of said plurality of springs comprises a compression coil spring.

13. The light shielding structure according to claim 1, wherein said plurality of springs are compressed in said optical axis direction with said annular light shielding member remaining held therebetween when said two optical elements are moved to closely approach each other in said optical axis direction.

14. A retractable lens barrel having at least one movable barrel capable of advancing and retracting in an optical axis direction, said retractable lens barrel comprising:
  a plurality of optical elements arranged at different positions in said optical axis direction;
  at least one annular light shielding member positioned around said optical axis between two optical elements of said plurality of optical elements; and
  a plurality of springs held between said two optical elements and compressed resiliently in said optical axis direction when said movable barrel retracts,
  wherein said annular light shielding member is supported between said two optical elements in a balanced state between the spring forces of said plurality of springs.

* * * * *